US009278283B2

(12) United States Patent
Walter et al.

(10) Patent No.: US 9,278,283 B2
(45) Date of Patent: *Mar. 8, 2016

(54) NETWORKED TELEVISION AND METHOD THEREOF

(71) Applicant: AT&T INTELLECTUAL PROPERTY I, L.P., Atlanta, GA (US)

(72) Inventors: Edward Walter, Boerne, TX (US); Yolius Diroo, San Antonio, TX (US); Steven M. Wollmershauser, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 604 days.

This patent is subject to a terminal disclaimer.

(21) Appl. No.: 13/677,487

(22) Filed: Nov. 15, 2012

(65) Prior Publication Data

US 2013/0079129 A1 Mar. 28, 2013

Related U.S. Application Data

(63) Continuation of application No. 11/166,909, filed on Jun. 24, 2005, now Pat. No. 8,365,218.

(51) Int. Cl.
*H04N 7/16* (2011.01)
*G06F 3/00* (2006.01)
*G06F 13/00* (2006.01)
(Continued)

(52) U.S. Cl.
CPC .............. *A63F 13/12* (2013.01); *H04N 5/4401* (2013.01); *H04N 5/44543* (2013.01); *H04N 7/163* (2013.01); *H04N 21/4622* (2013.01); *H04N 21/482* (2013.01); *H04N 21/6125* (2013.01); *H04N 21/64322* (2013.01); *A63F 2300/409* (2013.01); *H04N 5/63* (2013.01)

(58) Field of Classification Search
None
See application file for complete search history.

(56) References Cited

U.S. PATENT DOCUMENTS 4,243,147 A 1/1981 Twitchell et al.
4,356,509 A 10/1982 Skerlos et al.
(Continued)

FOREIGN PATENT DOCUMENTS

JP 10257401 A 9/1998
WO 9963759 A2 12/1999
(Continued)

OTHER PUBLICATIONS

Burfield, P. "The Advantages of Using the IBM PowerPC Processor in the Set-Top Box," IBM Power Architecture Community Newsletter, http://www-03.ibm.com/-/technology/power/newsletter/december2004/article5.html, Dec. 2004, pp. 1-3.
(Continued)

*Primary Examiner* — Jonathan V Lewis
(74) *Attorney, Agent, or Firm* — Toler Law Group, PC

(57) ABSTRACT

A television includes a display, a first network interface to a packet-based network, and a decoder operable to process a multimedia data stream received via the first network interface. The television is operable to display content of the multimedia data stream on the display promptly upon receipt of a user request to power up the television. A method includes receiving a multimedia data stream at a network interface of a television, processing the multimedia data stream to generate content, and providing the video content to a display of the television.

20 Claims, 12 Drawing Sheets

(51) Int. Cl.
*H04N 5/445* (2011.01)
*A63F 13/30* (2014.01)
*H04N 21/462* (2011.01)
*H04N 21/482* (2011.01)
*H04N 5/44* (2011.01)
*H04N 21/61* (2011.01)
*H04N 21/643* (2011.01)
*H04N 5/63* (2006.01)

(56) References Cited

U.S. PATENT DOCUMENTS

| | | | |
|---|---|---|---|
| 4,768,926 A | 9/1988 | Gilbert, Jr. | |
| 4,907,079 A | 3/1990 | Turner et al. | |
| 5,126,731 A | 6/1992 | Cromer, Jr. et al. | |
| 5,144,438 A | 9/1992 | Kim | |
| 5,163,340 A | 11/1992 | Bender | |
| 5,355,162 A | 10/1994 | Yazolino et al. | |
| 5,475,835 A | 12/1995 | Hickey | |
| 5,532,748 A | 7/1996 | Naimpally | |
| 5,541,917 A | 7/1996 | Farris | |
| 5,577,735 A | 11/1996 | Reed et al. | |
| 5,583,560 A | 12/1996 | Florin et al. | |
| 5,589,892 A | 12/1996 | Knee et al. | |
| 5,592,212 A * | 1/1997 | Handelman | A63F 13/12 348/E7.056 |
| 5,592,477 A | 1/1997 | Farris et al. | |
| 5,610,916 A | 3/1997 | Kostreski et al. | |
| 5,613,012 A | 3/1997 | Hoffman et al. | |
| 5,630,757 A | 5/1997 | Gagin et al. | |
| 5,644,354 A | 7/1997 | Thompson et al. | |
| 5,650,831 A | 7/1997 | Farwell | |
| 5,651,332 A | 7/1997 | Moore et al. | |
| 5,654,746 A | 8/1997 | McMullan, Jr. et al. | |
| 5,656,898 A | 8/1997 | Kalina | |
| 5,675,390 A | 10/1997 | Schindler et al. | |
| 5,675,828 A * | 10/1997 | Stoel | A63F 13/12 345/2.1 |
| 5,708,961 A | 1/1998 | Hylton et al. | |
| 5,722,041 A | 2/1998 | Freadman | |
| 5,724,106 A | 3/1998 | Autry et al. | |
| 5,729,825 A | 3/1998 | Kostreski et al. | |
| 5,734,853 A | 3/1998 | Hendricks et al. | |
| 5,737,029 A | 4/1998 | Ohkura et al. | |
| 5,740,246 A | 4/1998 | Saito | |
| 5,752,082 A | 5/1998 | Staples | |
| 5,752,160 A | 5/1998 | Dunn | |
| 5,768,539 A | 6/1998 | Metz et al. | |
| 5,774,357 A | 6/1998 | Hoffberg et al. | |
| 5,793,438 A | 8/1998 | Bedard | |
| 5,805,719 A | 9/1998 | Pare, Jr. et al. | |
| 5,818,438 A | 10/1998 | Howe et al. | |
| 5,838,384 A | 11/1998 | Schindler et al. | |
| 5,838,812 A | 11/1998 | Pare, Jr. et al. | |
| 5,864,757 A | 1/1999 | Parker | |
| 5,867,223 A | 2/1999 | Schindler et al. | |
| 5,867,227 A | 2/1999 | Yamaguchi | |
| 5,874,986 A | 2/1999 | Gibbon et al. | |
| 5,887,243 A | 3/1999 | Harvey et al. | |
| 5,892,508 A | 4/1999 | Howe et al. | |
| 5,900,867 A | 5/1999 | Schindler et al. | |
| 5,900,868 A | 5/1999 | Duhault et al. | |
| 5,905,942 A | 5/1999 | Stoel et al. | |
| 5,910,970 A | 6/1999 | Lu | |
| 5,916,024 A * | 6/1999 | Von Kohorn | 463/40 |
| 5,926,175 A * | 7/1999 | Sturgeon et al. | 715/716 |
| 5,933,498 A | 8/1999 | Schneck et al. | |
| 5,953,318 A | 9/1999 | Nattkemper et al. | |
| 5,956,024 A | 9/1999 | Strickland et al. | |
| 5,956,081 A | 9/1999 | Katz et al. | |
| 5,956,716 A | 9/1999 | Kenner et al. | |
| 5,970,088 A | 10/1999 | Chen | |
| 5,987,061 A | 11/1999 | Chen | |
| 5,990,927 A | 11/1999 | Hendricks et al. | |
| 5,995,155 A | 11/1999 | Schindler et al. | |
| 5,999,518 A | 12/1999 | Nattkemper et al. | |
| 5,999,563 A | 12/1999 | Polley et al. | |
| 6,002,722 A | 12/1999 | Wu | |
| 6,005,561 A | 12/1999 | Hawkins et al. | |
| 6,014,184 A | 1/2000 | Knee et al. | |
| 6,021,158 A | 2/2000 | Schurr et al. | |
| 6,021,167 A | 2/2000 | Wu | |
| 6,028,600 A | 2/2000 | Rosin et al. | |
| 6,029,045 A * | 2/2000 | Picco et al. | |
| 6,029,046 A * | 2/2000 | Khan et al. | 725/31 |
| 6,038,251 A | 3/2000 | Chen | |
| 6,044,107 A | 3/2000 | Gatherer et al. | |
| 6,052,120 A | 4/2000 | Nahi et al. | |
| 6,055,268 A | 4/2000 | Timm et al. | |
| 6,055,560 A | 4/2000 | Mills et al. | |
| 6,058,430 A | 5/2000 | Kaplan | |
| 6,072,483 A | 6/2000 | Rosin et al. | |
| 6,084,584 A | 7/2000 | Nahi et al. | |
| 6,111,582 A | 8/2000 | Jenkins | |
| 6,118,498 A | 9/2000 | Reitmeier | |
| 6,122,660 A | 9/2000 | Baransky et al. | |
| 6,124,799 A | 9/2000 | Parker | |
| 6,137,839 A | 10/2000 | Mannering et al. | |
| 6,166,734 A | 12/2000 | Nahi et al. | |
| 6,177,931 B1 | 1/2001 | Alexander et al. | |
| 6,181,335 B1 | 1/2001 | Hendricks et al. | |
| 6,192,282 B1 | 2/2001 | Smith et al. | |
| 6,195,692 B1 | 2/2001 | Hsu | |
| 6,208,326 B1 | 3/2001 | Frederick et al. | |
| 6,215,483 B1 | 4/2001 | Zigmond | |
| 6,229,532 B1 | 5/2001 | Fujii | |
| 6,237,022 B1 | 5/2001 | Bruck et al. | |
| 6,252,588 B1 | 6/2001 | Dawson | |
| 6,252,989 B1 | 6/2001 | Geisler et al. | |
| 6,260,192 B1 | 7/2001 | Rosin et al. | |
| 6,269,394 B1 | 7/2001 | Kenner et al. | |
| 6,275,268 B1 | 8/2001 | Ellis et al. | |
| 6,275,989 B1 | 8/2001 | Broadwin et al. | |
| 6,281,813 B1 | 8/2001 | Vierthaler et al. | |
| 6,286,142 B1 | 9/2001 | Ehreth | |
| 6,295,057 B1 | 9/2001 | Rosin et al. | |
| 6,311,214 B1 | 10/2001 | Rhoads | |
| 6,314,409 B2 | 11/2001 | Schneck et al. | |
| 6,330,021 B1 | 12/2001 | Devaux | |
| 6,343,366 B1 | 1/2002 | Okitaka | |
| 6,344,882 B1 | 2/2002 | Shim et al. | |
| 6,357,043 B1 | 3/2002 | Ellis et al. | |
| 6,359,636 B1 | 3/2002 | Schindler et al. | |
| 6,363,149 B1 | 3/2002 | Candelore | |
| 6,385,693 B1 | 5/2002 | Gerszberg et al. | |
| 6,396,480 B1 | 5/2002 | Schindler et al. | |
| 6,396,531 B1 | 5/2002 | Gerszberg et al. | |
| 6,396,544 B1 | 5/2002 | Schindler et al. | |
| 6,397,387 B1 | 5/2002 | Rosin et al. | |
| 6,400,407 B1 | 6/2002 | Zigmond et al. | |
| 6,411,307 B1 | 6/2002 | Rosin et al. | |
| 6,442,285 B2 | 8/2002 | Rhoads et al. | |
| 6,442,549 B1 | 8/2002 | Schneider | |
| 6,449,601 B1 | 9/2002 | Friedland et al. | |
| 6,450,407 B1 | 9/2002 | Freeman et al. | |
| 6,460,075 B2 | 10/2002 | Krueger et al. | |
| 6,463,585 B1 | 10/2002 | Hendricks et al. | |
| 6,481,011 B1 | 11/2002 | Lemmons | |
| 6,486,892 B1 | 11/2002 | Stern | |
| 6,492,913 B2 | 12/2002 | Vierthaler et al. | |
| 6,496,983 B1 | 12/2002 | Schindler et al. | |
| 6,502,242 B1 | 12/2002 | Howe et al. | |
| 6,505,348 B1 | 1/2003 | Knowles et al. | |
| 6,510,519 B2 | 1/2003 | Wasilewski et al. | |
| 6,510,553 B1 | 1/2003 | Hazra | |
| 6,515,680 B1 | 2/2003 | Hendricks et al. | |
| 6,516,467 B1 | 2/2003 | Schindler et al. | |
| 6,519,011 B1 | 2/2003 | Shendar | |
| 6,522,769 B1 | 2/2003 | Rhoads et al. | |
| 6,526,577 B1 | 2/2003 | Knudson et al. | |
| 6,529,949 B1 | 3/2003 | Getsin et al. | |
| 6,535,590 B2 | 3/2003 | Tidwell et al. | |
| 6,538,704 B1 | 3/2003 | Grabb et al. | |
| 6,542,740 B1 | 4/2003 | Olgaard et al. | |

(56) References Cited

U.S. PATENT DOCUMENTS

| | | |
|---|---|---|
| 6,557,030 B1 | 4/2003 | Hoang |
| 6,557,756 B1 | 5/2003 | Smith |
| 6,567,982 B1 | 5/2003 | Howe et al. |
| 6,587,127 B1 | 7/2003 | Leeke et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,664,459 B2 | 12/2003 | Lee et al. |
| 6,675,388 B1 | 1/2004 | Beckmann et al. |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,929 B1 | 3/2004 | Ozer et al. |
| 6,704,931 B1 | 3/2004 | Schaffer et al. |
| 6,714,264 B1 | 3/2004 | Kempisty |
| 6,721,881 B1 | 4/2004 | Bian et al. |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,028 B1 | 7/2004 | Sass et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht |
| 6,788,709 B1 | 9/2004 | Hyakutake |
| 6,804,824 B1 | 10/2004 | Potrebic et al. |
| 6,826,173 B1 | 11/2004 | Kung et al. |
| 6,826,775 B1 | 11/2004 | Howe et al. |
| 6,828,993 B1 | 12/2004 | Hendricks et al. |
| 6,839,705 B1 | 1/2005 | Grooters |
| 6,870,570 B1 | 3/2005 | Bowser |
| 6,870,573 B2 | 3/2005 | Yeo et al. |
| 6,909,874 B2 | 6/2005 | Holtz et al. |
| 6,938,021 B2 | 8/2005 | Shear et al. |
| 7,120,926 B1 | 10/2006 | Safadi et al. |
| 7,180,511 B2 | 2/2007 | Shigeta |
| 7,205,891 B1 | 4/2007 | McGlothlin et al. |
| 7,253,732 B2 | 8/2007 | Osann, Jr. |
| 7,307,574 B2 | 12/2007 | Kortum et al. |
| 7,310,807 B2 | 12/2007 | Pearson et al. |
| 7,379,655 B1 | 5/2008 | Koyabu et al. |
| 7,429,191 B2 | 9/2008 | Diaz et al. |
| 7,436,346 B2 | 10/2008 | Walter et al. |
| 7,474,359 B2 | 1/2009 | Sullivan et al. |
| 7,571,453 B2 | 8/2009 | Knudson |
| 7,653,614 B2 | 1/2010 | Smith |
| 7,657,910 B1 * | 2/2010 | McAulay ............... A63F 13/12 715/716 |
| 7,685,616 B2 | 3/2010 | Virdi et al. |
| 7,716,714 B2 | 5/2010 | Kortum et al. |
| 7,850,526 B2 | 12/2010 | Zalewski et al. |
| 7,850,527 B2 | 12/2010 | Barney et al. |
| 7,857,701 B2 * | 12/2010 | Murphy ................. A63F 13/12 463/42 |
| 7,873,102 B2 | 1/2011 | Van Vleck et al. |
| 7,908,627 B2 | 3/2011 | Ansari et al. |
| 7,917,937 B1 | 3/2011 | Fernandez et al. |
| 8,042,132 B2 | 10/2011 | Carney et al. |
| 8,054,849 B2 | 11/2011 | Nadarajah |
| 8,086,261 B2 | 12/2011 | Radpour |
| 8,092,307 B2 * | 1/2012 | Kelly ..................... A63F 3/081 463/25 |
| 8,113,955 B1 | 2/2012 | Bae et al. |
| 8,166,498 B2 | 4/2012 | Walter |
| 8,190,688 B2 | 5/2012 | Kortum et al. |
| 8,214,859 B2 | 7/2012 | Kortum et al. |
| 8,282,476 B2 | 10/2012 | Walter |
| 8,365,218 B2 | 1/2013 | Walter et al. |
| 2001/0004769 A1 | 6/2001 | Simon |
| 2001/0011261 A1 | 8/2001 | Mullen-Schultz |
| 2001/0016945 A1 | 8/2001 | Inoue |
| 2001/0016946 A1 | 8/2001 | Inoue |
| 2001/0034257 A1 | 10/2001 | Weston et al. |
| 2001/0034664 A1 | 10/2001 | Brunson |
| 2001/0044794 A1 | 11/2001 | Nasr et al. |
| 2001/0048677 A1 | 12/2001 | Boys |
| 2001/0049826 A1 | 12/2001 | Wilf |
| 2001/0054008 A1 | 12/2001 | Miller et al. |
| 2001/0054009 A1 | 12/2001 | Miller et al. |
| 2001/0054067 A1 | 12/2001 | Miller et al. |
| 2001/0056350 A1 | 12/2001 | Calderone et al. |
| 2002/0001303 A1 | 1/2002 | Boys |
| 2002/0001310 A1 | 1/2002 | Mai et al. |
| 2002/0002496 A1 | 1/2002 | Miller et al. |
| 2002/0003166 A1 | 1/2002 | Miller et al. |
| 2002/0007307 A1 | 1/2002 | Miller et al. |
| 2002/0007313 A1 | 1/2002 | Mai et al. |
| 2002/0007485 A1 | 1/2002 | Rodriguez et al. |
| 2002/0010639 A1 | 1/2002 | Howey et al. |
| 2002/0010745 A1 | 1/2002 | Schneider |
| 2002/0010935 A1 | 1/2002 | Sitnik |
| 2002/0016736 A1 | 2/2002 | Cannon et al. |
| 2002/0022963 A1 | 2/2002 | Miller et al. |
| 2002/0022970 A1 | 2/2002 | Noll et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0026475 A1 | 2/2002 | Marmor |
| 2002/0029181 A1 | 3/2002 | Miller et al. |
| 2002/0030105 A1 | 3/2002 | Miller et al. |
| 2002/0032603 A1 | 3/2002 | Yeiser |
| 2002/0035404 A1 | 3/2002 | Ficco et al. |
| 2002/0040475 A1 | 4/2002 | Yap et al. |
| 2002/0042915 A1 | 4/2002 | Kubischta et al. |
| 2002/0046093 A1 | 4/2002 | Miller et al. |
| 2002/0049635 A1 | 4/2002 | Mai et al. |
| 2002/0054087 A1 | 5/2002 | Noll et al. |
| 2002/0054750 A1 | 5/2002 | Ficco et al. |
| 2002/0059163 A1 | 5/2002 | Smith |
| 2002/0059425 A1 | 5/2002 | Belfiore et al. |
| 2002/0059599 A1 | 5/2002 | Schein et al. |
| 2002/0065717 A1 | 5/2002 | Miller et al. |
| 2002/0067438 A1 | 6/2002 | Baldock |
| 2002/0069220 A1 | 6/2002 | Tran |
| 2002/0069282 A1 | 6/2002 | Reisman |
| 2002/0069294 A1 | 6/2002 | Herkersdorf et al. |
| 2002/0072970 A1 | 6/2002 | Miller et al. |
| 2002/0078442 A1 | 6/2002 | Reyes et al. |
| 2002/0078453 A1 | 6/2002 | Kuo |
| 2002/0097261 A1 | 7/2002 | Gottfurcht et al. |
| 2002/0104099 A1 | 8/2002 | Novak |
| 2002/0106119 A1 | 8/2002 | Foran et al. |
| 2002/0112239 A1 | 8/2002 | Goldman |

(56) References Cited

U.S. PATENT DOCUMENTS

| | | |
|---|---|---|
| 2002/0116392 A1 | 8/2002 | McGrath et al. |
| 2002/0124055 A1 | 9/2002 | Reisman |
| 2002/0128061 A1 | 9/2002 | Blanco |
| 2002/0129094 A1 | 9/2002 | Reisman |
| 2002/0133402 A1 | 9/2002 | Faber et al. |
| 2002/0138840 A1 | 9/2002 | Schein et al. |
| 2002/0144265 A1 | 10/2002 | Connelly |
| 2002/0147982 A1 | 10/2002 | Naidoo et al. |
| 2002/0152264 A1 | 10/2002 | Yamasaki |
| 2002/0157113 A1 | 10/2002 | Allegrezza |
| 2002/0157115 A1* | 10/2002 | Lu .................... 725/131 |
| 2002/0169611 A1 | 11/2002 | Guerra et al. |
| 2002/0170063 A1 | 11/2002 | Ansari et al. |
| 2002/0173344 A1 | 11/2002 | Cupps et al. |
| 2002/0188955 A1 | 12/2002 | Thompson et al. |
| 2002/0193997 A1 | 12/2002 | Fitzpatrick et al. |
| 2002/0194601 A1 | 12/2002 | Perkes et al. |
| 2002/0198874 A1 | 12/2002 | Nasr et al. |
| 2003/0005445 A1 | 1/2003 | Schein et al. |
| 2003/0009771 A1 | 1/2003 | Chang |
| 2003/0012365 A1 | 1/2003 | Goodman |
| 2003/0014750 A1 | 1/2003 | Kamen |
| 2003/0018975 A1 | 1/2003 | Stone |
| 2003/0023435 A1 | 1/2003 | Josephson |
| 2003/0023440 A1 | 1/2003 | Chu |
| 2003/0028890 A1 | 2/2003 | Swart et al. |
| 2003/0033416 A1 | 2/2003 | Schwartz |
| 2003/0043915 A1 | 3/2003 | Costa et al. |
| 2003/0046091 A1 | 3/2003 | Arneson et al. |
| 2003/0046689 A1 | 3/2003 | Gaos |
| 2003/0056223 A1 | 3/2003 | Costa et al. |
| 2003/0058277 A1 | 3/2003 | Bowman-Amuah |
| 2003/0061611 A1 | 3/2003 | Pendakur |
| 2003/0068155 A1 | 4/2003 | Vasilevsky et al. |
| 2003/0071792 A1 | 4/2003 | Safadi |
| 2003/0093793 A1 | 5/2003 | Gutta |
| 2003/0097661 A1 | 5/2003 | Li et al. |
| 2003/0100340 A1 | 5/2003 | Cupps et al. |
| 2003/0106069 A1 | 6/2003 | Crinon |
| 2003/0110161 A1 | 6/2003 | Schneider |
| 2003/0110503 A1 | 6/2003 | Perkes |
| 2003/0126136 A1 | 7/2003 | Omoigui |
| 2003/0135771 A1 | 7/2003 | Cupps et al. |
| 2003/0141987 A1 | 7/2003 | Hayes |
| 2003/0145321 A1 | 7/2003 | Bates et al. |
| 2003/0149989 A1 | 8/2003 | Hunter et al. |
| 2003/0153353 A1 | 8/2003 | Cupps et al. |
| 2003/0153354 A1 | 8/2003 | Cupps et al. |
| 2003/0159026 A1 | 8/2003 | Cupps et al. |
| 2003/0159143 A1 | 8/2003 | Chan |
| 2003/0160830 A1 | 8/2003 | DeGross |
| 2003/0163601 A1 | 8/2003 | Cupps et al. |
| 2003/0163666 A1 | 8/2003 | Cupps et al. |
| 2003/0167472 A1 | 9/2003 | Barbanson et al. |
| 2003/0172380 A1 | 9/2003 | Kikinis |
| 2003/0182237 A1 | 9/2003 | Costa et al. |
| 2003/0182420 A1 | 9/2003 | Jones et al. |
| 2003/0185232 A1 | 10/2003 | Moore et al. |
| 2003/0187641 A1 | 10/2003 | Moore et al. |
| 2003/0187646 A1 | 10/2003 | Smyers et al. |
| 2003/0187800 A1 | 10/2003 | Moore et al. |
| 2003/0189509 A1 | 10/2003 | Hayes et al. |
| 2003/0189589 A1 | 10/2003 | LeBlanc et al. |
| 2003/0194141 A1 | 10/2003 | Kortum et al. |
| 2003/0194142 A1 | 10/2003 | Kortum et al. |
| 2003/0208396 A1 | 11/2003 | Miller et al. |
| 2003/0208758 A1 | 11/2003 | Schein et al. |
| 2003/0216181 A1 | 11/2003 | Danieli et al. |
| 2003/0220140 A1* | 11/2003 | Leung ..................... 463/31 |
| 2003/0221198 A1 | 11/2003 | Sloo |
| 2003/0226044 A1 | 12/2003 | T. Cupps et al. |
| 2003/0226145 A1 | 12/2003 | Marsh |
| 2003/0229900 A1 | 12/2003 | Reisman |
| 2004/0003041 A1 | 1/2004 | Moore et al. |
| 2004/0003403 A1 | 1/2004 | Marsh |
| 2004/0003412 A1 | 1/2004 | Halbert |
| 2004/0006769 A1 | 1/2004 | Ansari et al. |
| 2004/0006772 A1 | 1/2004 | Ansari et al. |
| 2004/0010602 A1 | 1/2004 | Van Vleck et al. |
| 2004/0015997 A1 | 1/2004 | Ansari et al. |
| 2004/0028391 A1 | 2/2004 | Black et al. |
| 2004/0030750 A1 | 2/2004 | Moore et al. |
| 2004/0031058 A1 | 2/2004 | Reisman |
| 2004/0031856 A1 | 2/2004 | Atsmon et al. |
| 2004/0034877 A1 | 2/2004 | Nogues |
| 2004/0049728 A1 | 3/2004 | Langford |
| 2004/0064351 A1 | 4/2004 | Mikurak |
| 2004/0068740 A1 | 4/2004 | Fukuda et al. |
| 2004/0068753 A1 | 4/2004 | Robertson et al. |
| 2004/0070491 A1 | 4/2004 | Huang et al. |
| 2004/0073918 A1 | 4/2004 | Ferman et al. |
| 2004/0090391 A1 | 5/2004 | Kondo |
| 2004/0093619 A1 | 5/2004 | Cox |
| 2004/0098571 A1 | 5/2004 | Falcon |
| 2004/0103439 A1* | 5/2004 | Macrae ............. H04N 5/4403<br>725/109 |
| 2004/0107125 A1 | 6/2004 | Guheen et al. |
| 2004/0107439 A1 | 6/2004 | Hassell et al. |
| 2004/0111745 A1 | 6/2004 | Schein et al. |
| 2004/0111756 A1 | 6/2004 | Stuckman et al. |
| 2004/0116045 A1 | 6/2004 | Coleman |
| 2004/0116183 A1 | 6/2004 | Prindle |
| 2004/0117813 A1 | 6/2004 | Karaoguz et al. |
| 2004/0117824 A1 | 6/2004 | Karaoguz et al. |
| 2004/0128342 A1 | 7/2004 | Maes et al. |
| 2004/0139173 A1 | 7/2004 | Karaoguz et al. |
| 2004/0143600 A1 | 7/2004 | Musgrove et al. |
| 2004/0143652 A1 | 7/2004 | Grannan et al. |
| 2004/0143838 A1* | 7/2004 | Rose ........................ 725/25 |
| 2004/0148408 A1 | 7/2004 | Nadarajah |
| 2004/0150676 A1 | 8/2004 | Gottfurcht et al. |
| 2004/0163134 A1 | 8/2004 | Willis |
| 2004/0166939 A1 | 8/2004 | Leifer et al. |
| 2004/0168185 A1 | 8/2004 | Dawson et al. |
| 2004/0183839 A1 | 9/2004 | Gottfurcht et al. |
| 2004/0194136 A1 | 9/2004 | Finseth et al. |
| 2004/0198386 A1 | 10/2004 | Dupray |
| 2004/0201600 A1 | 10/2004 | Kakivaya et al. |
| 2004/0205821 A1 | 10/2004 | Yamada et al. |
| 2004/0210633 A1 | 10/2004 | Brown et al. |
| 2004/0210935 A1 | 10/2004 | Schein et al. |
| 2004/0213271 A1 | 10/2004 | Lovy et al. |
| 2004/0221302 A1 | 11/2004 | Ansari et al. |
| 2004/0223485 A1 | 11/2004 | Arellano et al. |
| 2004/0226035 A1 | 11/2004 | Hauser, Jr. |
| 2004/0228175 A1 | 11/2004 | Candelore et al. |
| 2004/0234088 A1 | 11/2004 | McCarty et al. |
| 2004/0239624 A1 | 12/2004 | Ramian |
| 2004/0252119 A1 | 12/2004 | Hunleth et al. |
| 2004/0252120 A1 | 12/2004 | Hunleth et al. |
| 2004/0252769 A1 | 12/2004 | Costa et al. |
| 2004/0252770 A1 | 12/2004 | Costa et al. |
| 2004/0260407 A1 | 12/2004 | Wimsatt |
| 2004/0261116 A1 | 12/2004 | McKeown et al. |
| 2004/0267729 A1 | 12/2004 | Swaminathan et al. |
| 2004/0268393 A1 | 12/2004 | Hunleth et al. |
| 2004/0268400 A1 | 12/2004 | Barde et al. |
| 2005/0026700 A1 | 2/2005 | Blanco |
| 2005/0027851 A1 | 2/2005 | McKeown et al. |
| 2005/0038814 A1 | 2/2005 | Iyengar et al. |
| 2005/0044280 A1 | 2/2005 | Reisman |
| 2005/0060759 A1 | 3/2005 | Rowe et al. |
| 2005/0071782 A1 | 3/2005 | Barrett et al. |
| 2005/0083412 A1 | 4/2005 | Murphy |
| 2005/0086706 A1 | 4/2005 | Kasamatsu et al. |
| 2005/0097612 A1 | 5/2005 | Pearson et al. |
| 2005/0123136 A1 | 6/2005 | Shin et al. |
| 2005/0132295 A1 | 6/2005 | Noll et al. |
| 2005/0132414 A1 | 6/2005 | Bentley et al. |
| 2005/0149654 A1 | 7/2005 | Holloway et al. |
| 2005/0149973 A1 | 7/2005 | Fang |
| 2005/0149988 A1 | 7/2005 | Grannan |
| 2005/0155083 A1 | 7/2005 | Oh et al. |
| 2005/0166253 A1 | 7/2005 | Fairhurst et al. |

(56) References Cited

U.S. PATENT DOCUMENTS

| | | |
|---|---|---|
| 2005/0193322 A1 | 9/2005 | Lamkin et al. |
| 2005/0195961 A1 | 9/2005 | Pasquale et al. |
| 2005/0206513 A1 | 9/2005 | Fallon |
| 2005/0222820 A1 | 10/2005 | Chung |
| 2005/0270151 A1 | 12/2005 | Winick |
| 2005/0273815 A1 | 12/2005 | Orr et al. |
| 2005/0276567 A1 | 12/2005 | Okuyama et al. |
| 2006/0010199 A1 | 1/2006 | Brailean et al. |
| 2006/0022816 A1 | 2/2006 | Yukawa |
| 2006/0026663 A1 | 2/2006 | Kortum et al. |
| 2006/0037043 A1 | 2/2006 | Kortum et al. |
| 2006/0037083 A1 | 2/2006 | Kortum et al. |
| 2006/0041923 A1 | 2/2006 | McQuaide, Jr. |
| 2006/0048178 A1 | 3/2006 | Kortum et al. |
| 2006/0053447 A1 | 3/2006 | Krzyzanowski et al. |
| 2006/0078309 A1 | 4/2006 | Chen et al. |
| 2006/0085831 A1 | 4/2006 | Jones, III et al. |
| 2006/0085859 A1 | 4/2006 | Okamoto et al. |
| 2006/0090079 A1 | 4/2006 | Oh et al. |
| 2006/0114360 A1 | 6/2006 | Kortum et al. |
| 2006/0136964 A1* | 6/2006 | Diez ............... A63F 13/12 725/37 |
| 2006/0150237 A1 | 7/2006 | Mesut et al. |
| 2006/0156372 A1 | 7/2006 | Cansler, Jr. et al. |
| 2006/0161953 A1 | 7/2006 | Walter et al. |
| 2006/0168610 A1 | 7/2006 | Noil Williams et al. |
| 2006/0174279 A1 | 8/2006 | Sullivan et al. |
| 2006/0174309 A1 | 8/2006 | Pearson |
| 2006/0174609 A1 | 8/2006 | Heath |
| 2006/0179466 A1 | 8/2006 | Pearson et al. |
| 2006/0179468 A1 | 8/2006 | Pearson et al. |
| 2006/0184973 A1 | 8/2006 | de Heer et al. |
| 2006/0184991 A1 | 8/2006 | Schlamp et al. |
| 2006/0190402 A1 | 8/2006 | Patron et al. |
| 2006/0216181 A1 | 9/2006 | Yanagisawa et al. |
| 2006/0218590 A1 | 9/2006 | White |
| 2006/0230421 A1 | 10/2006 | Pierce et al. |
| 2006/0230427 A1 | 10/2006 | Kunkel et al. |
| 2006/0236343 A1 | 10/2006 | Chang |
| 2006/0236354 A1 | 10/2006 | Sutardja |
| 2006/0242670 A1 | 10/2006 | Teichner et al. |
| 2006/0273831 A1 | 12/2006 | Maksimovic et al. |
| 2006/0282785 A1 | 12/2006 | McCarthy et al. |
| 2006/0290814 A1 | 12/2006 | Walter |
| 2006/0293100 A1 | 12/2006 | Walter |
| 2006/0294553 A1 | 12/2006 | Walter et al. |
| 2006/0294561 A1 | 12/2006 | Grannan et al. |
| 2006/0294568 A1 | 12/2006 | Walter |
| 2006/0294572 A1 | 12/2006 | Walter |
| 2007/0011133 A1 | 1/2007 | Chang |
| 2007/0011702 A1* | 1/2007 | Vaysman ............... 725/45 |
| 2007/0021211 A1 | 1/2007 | Walter |
| 2007/0061831 A1 | 3/2007 | Savoor et al. |
| 2007/0081551 A1 | 4/2007 | Oishi et al. |
| 2007/0089145 A1 | 4/2007 | Medford et al. |
| 2007/0150930 A1 | 6/2007 | Koivisto et al. |
| 2007/0162979 A1 | 7/2007 | Kamperman et al. |
| 2007/0180485 A1 | 8/2007 | Dua |
| 2007/0190857 A1 | 8/2007 | Galang et al. |
| 2007/0192791 A1 | 8/2007 | Sullivan et al. |
| 2007/0192816 A1 | 8/2007 | Collet et al. |
| 2007/0245391 A1 | 10/2007 | Pont |
| 2007/0250896 A1 | 10/2007 | Parker et al. |
| 2007/0256111 A1 | 11/2007 | Medford et al. |
| 2008/0279179 A1 | 11/2008 | Baker |
| 2008/0316367 A1* | 12/2008 | Vasella ............... 348/706 |
| 2010/0141851 A1* | 6/2010 | Kendall ............... 348/734 |
| 2013/0012318 A1 | 1/2013 | Walter |
| 2013/0079129 A1 | 3/2013 | Walter et al. |

FOREIGN PATENT DOCUMENTS

| | | |
|---|---|---|
| WO | 0028689 A2 | 5/2000 |
| WO | 0036812 A1 | 6/2000 |
| WO | 0055769 A2 | 9/2000 |
| WO | 0160066 A1 | 8/2001 |
| WO | 0178381 A2 | 10/2001 |
| WO | 0217627 A2 | 2/2002 |
| WO | 02058382 A1 | 7/2002 |
| WO | 03003710 A2 | 1/2003 |
| WO | 03025726 A1 | 3/2003 |
| WO | 03047710 A2 | 6/2003 |
| WO | 2004018060 A2 | 3/2004 |
| WO | 2004032514 A1 | 4/2004 |
| WO | 2004062279 A1 | 7/2004 |
| WO | 2004068855 A1 | 8/2004 |
| WO | 2005045554 A2 | 5/2005 |

OTHER PUBLICATIONS

Nicklin, D. "Xilinx at Work in Set-Top Boxes," Xilinx WP1000, Mar. 28, 2000, pp. 1-11, V. 1.0, Xilinx, Inc.

Wittress, B. "Windows CE.NET 4.2 and Windows XP Embedded-Scalable Software Platforms for Building Flexible, IP Set-Top Boxes," Microsoft Windows Embedded Internet Protocol (IP) Set-Top Boxes, Sep. 2003, pp. 1-19.

"Digital Set-Top Boxes & Integrated Digital Television Systems," http://www.altera.com/solutions/consumer/dtv/csm-digititaltv. html?f=sscon&k=g2, 2005, pp. 1-3, Altera Corporation, San Jose, CA.

"DTT STB system solution," Philips Semiconductors, Doc. Order No. 9397 750 11803, Aug. 2003, pp. 1-4, Koninklijke Philips Electronics, Netherlands.

Non-Final Rejection for U.S. Appl. No. 11/166,785 mailed Jul. 1, 2009, 18 pages.

Final Rejection for U.S. Appl. No. 11/166,785 mailed Dec. 9, 2009, 24 pages.

Non-Final Rejection for U.S. Appl. No. 11/166,785 mailed Apr. 27, 2010, 24 pages.

Final Rejection for U.S. Appl. No. 11/166,785 mailed Oct. 4, 2010, 26 pages.

Non-Final Rejection for U.S. Appl. No. 11/166,785 mailed Apr. 6, 2011, 26 pages.

Non-Final Rejection for U.S. Appl. No. 11/116,785 mailed Sep. 28, 2011, 27 pages.

Notice of Allowance for U.S. Appl. No. 11/166,785 mailed Mar. 5, 2012, 8 pages.

Notice of Allowance for U.S. Appl. No. 11/166,786 mailed May 31, 2012, 16 pages.

Non-Final Rejection for U.S. Appl. No. 11/166,909 mailed Jan. 8, 2009, 28 pages.

Final Rejection for U.S. Appl. No. 11/166,909 mailed Jun. 23, 2009, 23 pages.

Non-Final Rejection for U.S. Appl. No. 11/166,909 mailed Oct. 2, 2009, 34 pages.

Final Rejection for U.S. Appl. No. 11/166,909 mailed May 13, 2010, 38 pages.

Non-Final Rejection for U.S. Appl. No. 11/166,909 mailed Dec. 20, 2011, 38 pages.

Notice of Allowance for U.S. Appl. No. 11/166,909 mailed Oct. 4, 2012, 9 pages.

Kapinos, S., "Accenda Universal Remote Control Targets Needs of Elderly, Visually Impaired, Physically Challenged . . . and the Rest of Us," Press Release, Dec. 15, 2002, Innotech Systems Inc., Port Jefferson, NY, 4 pages.

* cited by examiner

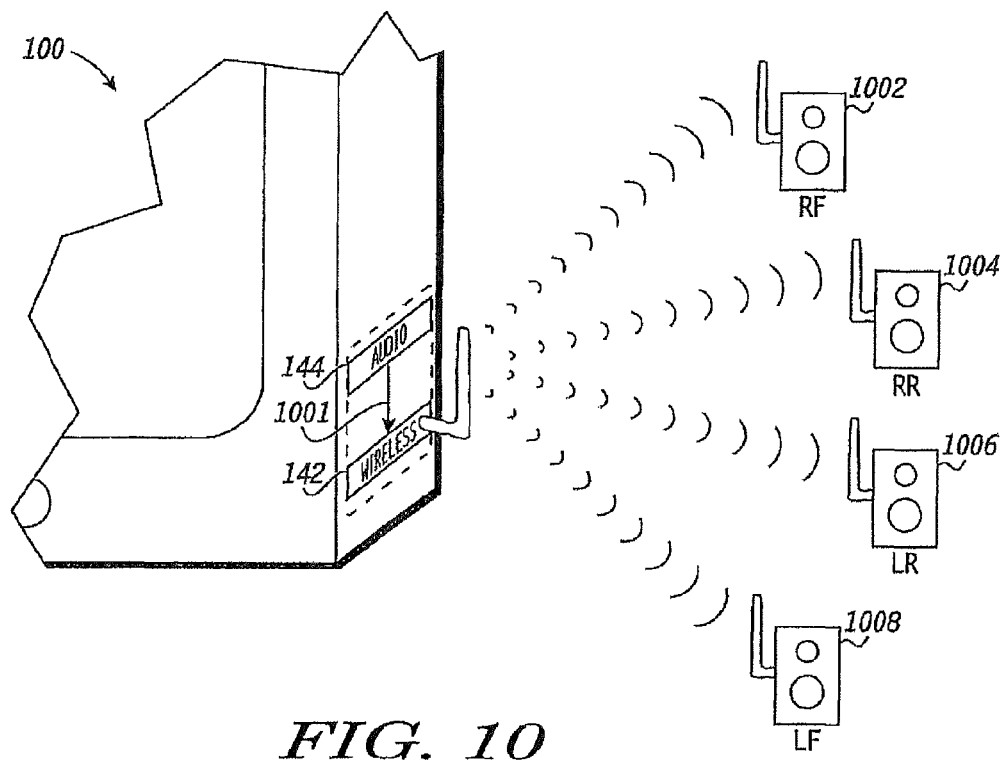
FIG. 10
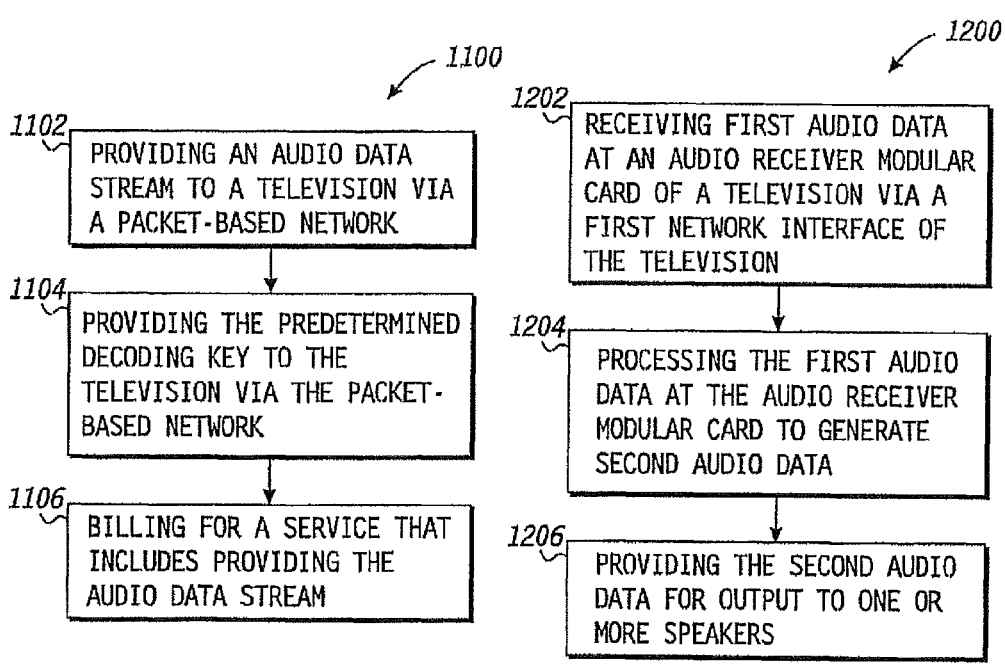
FIG. 11
FIG. 12

NETWORKED TELEVISION AND METHOD THEREOF

CROSS-REFERENCE TO RELATED APPLICATION

The present application is a continuation of, and claims priority to, U.S. patent application Ser. No. 11/166,909, filed on Jun. 24, 2005, entitled "Networked Television and Method Thereof," which is hereby incorporated by reference in its entirety.

The present application is related to U.S. patent application Ser. No. 11/166,785, filed on Jun. 24, 2005, and entitled "Multimedia-Based Video Game Distribution," now issued as U.S. Pat. No. 8,282,476, and U.S. patent application Ser. No. 11/166,908, filed on Jun. 24, 2005, and entitled "Video Game Console Modular Card and Method Thereof," and U.S. patent application Ser. No. 11/166,907, filed on Jun. 24, 2005, and entitled "Audio Receiver Modular Card and Method Thereof," assigned to the current assignee hereof.

FIELD OF THE DISCLOSURE

The present application relates generally to processing and displaying multimedia data received via a network at a television.

BACKGROUND

Television has become integral to the daily experience of most consumers. Until recently, television content was provided only as an analog signal either by means of a wireless transmission (e.g., network television) or via coaxial cable (e.g., cable television). However, as viewers turn to higher-quality video and begin to demand additional features, such as video-on-demand, content providers have begun to rely on digital solutions, such as video streaming over networks or digital cable transmissions. While these digital solutions often provide many of the features sought by consumers, they typically require the consumer to invest in expensive and complex equipment.

To illustrate, consumers typically must utilize a personal computer (PC) to receive and display video content streamed or otherwise provided via a computer network. However, PCs are designed to support a wide variety of functions, from Internet browsing and word processing to the processing of detailed scientific data. As such, PCs implement complex hardware architectures and sophisticated operating systems in order to be capable of supporting the widely divergent tasks expected of them. The complexity of PCs results in a user experience that is different from the traditional television experience in that they often require a substantial amount of time to "boot up" before they can be operated by a user, whereas conventional televisions typically are ready to provide video content almost immediately. Moreover, with their multitude of exposed cables and constant fan noise, PCs often present an aesthetically unappealing solution for television viewing. Similarly, the set-top boxes typically required for receiving and processing digital cable transmissions often detract from the visual appeal of the television setting. Moreover, as opposed to PCs, conventional set-top boxes typically are of limited functionality in that they typically interface only with coaxial cable connections and provide functions directed to processing video and audio content of a cable television transmission.

BRIEF DESCRIPTION OF THE DRAWINGS

The present invention is pointed out with particularity in the appended claims. However, other features are described in the following detailed description in conjunction with the accompanying drawings in which:

FIG. 10 is a diagram illustrating an exemplary distribution of audio content to speakers via a wireless medium in accordance with at least one embodiment of the present disclosure.

FIG. 11 is a flow diagram illustrating an exemplary method for processing audio data at a networked television in accordance with at least one embodiment of the present disclosure.

FIG. 12 is a flow diagram illustrating an exemplary method for providing audio data to a networked television for processing in accordance with at least one embodiment of the present disclosure.

DETAILED DESCRIPTION OF THE DRAWINGS

In accordance with one aspect of the present disclosure, a television is provided. The television includes a display, a first network interface to a packet-based network, and a decoder operable to process a multimedia data stream received via the first network interface. The television is operable to display video content of the multimedia data stream on the display promptly upon receipt of a user request to power up the television.

In accordance with another aspect of the present disclosure, the television includes a display, a first network interface to a packet-based network, a processor to process data transmitted via the first network interface, a first modular card interface coupled to the processor and a multimedia decoder card coupled to the first modular card interface. The multimedia decoder card processes multimedia data received via the first network interface. The television is operable to display video content represented by at least a portion of the multimedia data promptly upon receipt of a request to power up the television.

In accordance with yet another aspect of the present disclosure, a method is provided. The method includes receiving a multimedia data stream at a network interface of a television. The network interface is coupled to a packet-based network. The method further includes processing the multimedia data stream at a decoder of the television to generate video content and providing the video content to a display of the television. The television displays video content of the multimedia data stream promptly upon receipt of a request to power up the television.

In accordance with an additional embodiment of the present disclosure, the method includes receiving a first multimedia data stream at a first network interface of a television and processing the first multimedia data stream at a decoder of the television to generate a second multimedia stream. The method further includes providing the second multimedia data stream for reception by a separately located networked device via a second network interface of the television. The first network interface is coupled to a packet-based network. The television displays video content of a multimedia data stream promptly upon receipt of a request to power up the television.

In accordance with another aspect of the present disclosure, the method includes providing a first data stream including multimedia data to a television via a packet-based network. The television includes a network interface to the packet-based network to receive the multimedia data and a decoder to process the multimedia data.

Figure 1:
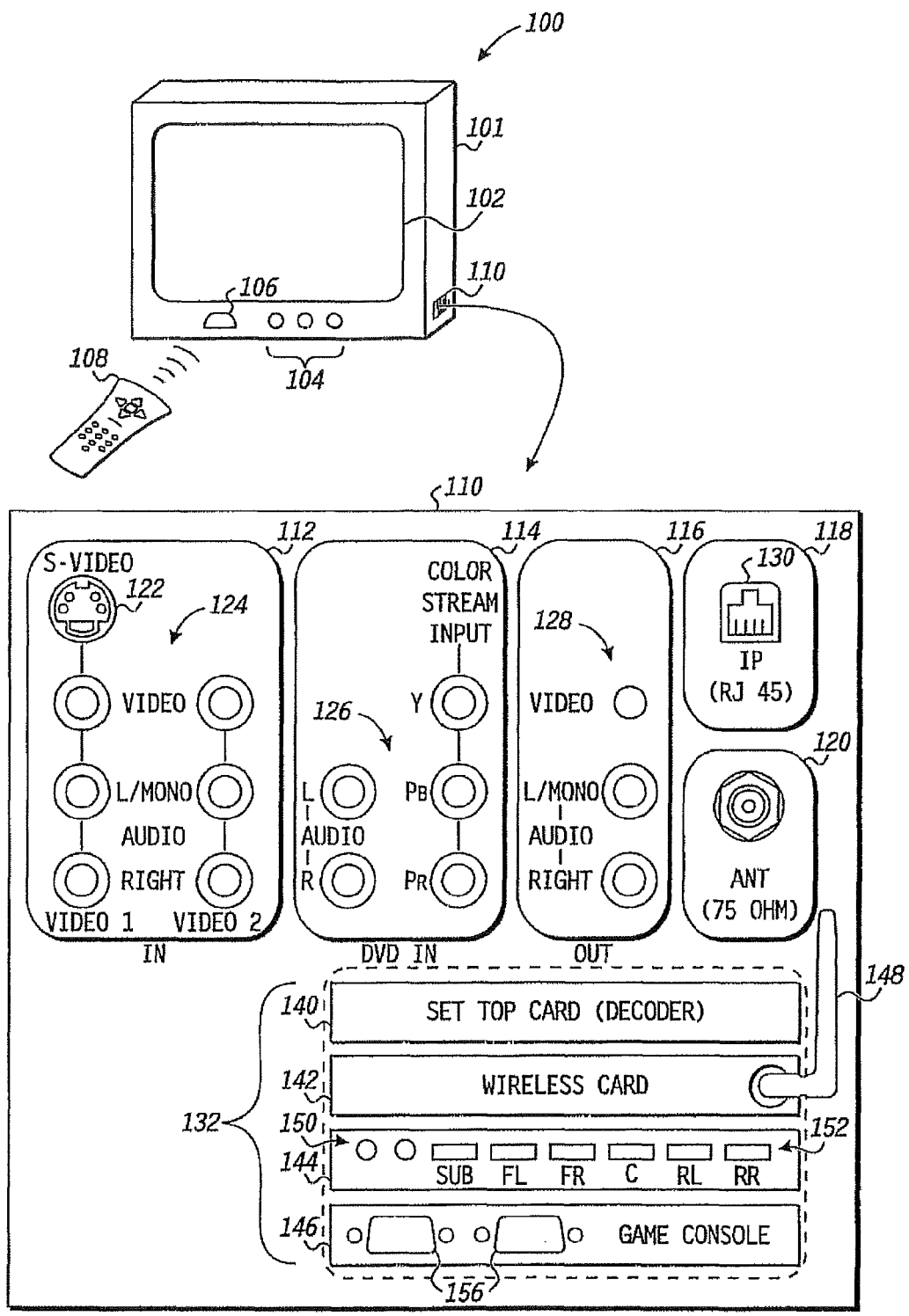
FIG. 1 is a diagram illustrating an exemplary networked television in accordance with at least one embodiment of the present disclosure.

Referring to FIG. 1, an exemplary networked television 100 is illustrated in accordance with at least one embodiment of the present disclosure. As depicted, the television 100 includes a housing 101 that contains a display 102, e.g., a liquid crystal display or a plasma display. Further, the housing 101 includes a plurality of user interface buttons 104, such as a power button, channel change buttons, volume control buttons, and the like. The housing 101 also includes a remote control interface 106, e.g., an infrared interface or a radio frequency (RF) interface, to receive remote control commands from a remote control 108. In a particular embodiment, one or more operations of the television 100 are responsive to the remote control commands. The television 100 further includes an interface panel 110 that is accessible via an external surface of the housing 101, at a top, back or side surface of the housing 101. The interface panel 110 includes one or more interfaces for receiving or outputting various forms of multimedia data. As shown, the interface panel 110 includes an IN component 112 that includes, for example, an S-video receptacle 122 or audio/visual receptacles 124 or a digital versatile disk (DVD) IN component 114 that is configured to receive video data and audio data from an external DVD player or other multimedia source. In particular, the DVD IN component 114 includes a plurality of receptacles 126 that can receive component video and audio. The panel 110 also can include an OUT component 116 that has receptacles 128 to provide video data and/or audio data to another television or recording device, such as a personal video recorder (PVR) or an external DVD player/recorder. An RF antenna receptacle 120 also can be incorporated into the panel 110 to receive multimedia data via RF transmissions.

In at least one embodiment, the panel 110 further includes a network interface 118 that includes a network receptacle 130 that can be connected to any of a variety of packet-based data networks. The receptacle 130 can be connected to an Internet Protocol (IP)-based network, e.g., an Ethernet network or an asynchronous transfer mode (ATM)-based network. Further, in a particular embodiment, the network interface 118 can include an Ethernet interface and as such, the network receptacle 130 can be an RJ-45 receptacle that is configured to receive an Ethernet cable that is connected to an Ethernet-based network. The television 100 can utilize the network interface 118 to receive multimedia data, e.g., video data, audio data, or videogame data, over a packet-based network for processing at the television 100. Moreover, the network interface 118 may be used by the television 100 to forward information to another networked device, such as another networked television 100. The forwarded information may include, for example, processed multimedia data or information associated with the multimedia data, information associated with a video game being played at the television 100, and the like.

As illustrated in FIG. 1, the panel 110 further can include one or more modular card receptacles 132 (also commonly referred to as "expansion slots") to interface with one or more modular cards (also commonly referred to as "expansion cards") to enhance the functionality of the television 100. The modular cards can include, for example, a multimedia decoder modular card 140, a wireless network interface modular card 142, an audio receiver modular card 144, a video game console modular card 146, and the like. In a particular embodiment, the modular card receptacles 132 and the corresponding modular cards 140, 142, 144 and 146 may be implemented using a standard architecture, such as a Peripheral Component Interconnect (PCI)-compliant architecture, an Industry Standard Architecture (ISA)-compliant architecture, or a Personal Computer Memory Card International Association (PCMCIA)-compliant architecture. Alternately, the modular card receptacles 132 and the corresponding modular cards 140, 142, 144 and 146 may be implemented using a proprietary architecture, or a combination of standard and proprietary architectures.

To customize the functionality of the television 100, modular cards may be added to or removed from the television by inserting or removing the modular cards from their corresponding modular card receptacles. For example, the panel 110 may include an opening in the housing for each modular card receptacle 132 and each modular card receptacle 132 may receive a modular card that is inserted through the corresponding opening so that the contacts of the modular card receptacle interface are brought into secure contact with the contacts of the receiving modular card receptacle 132. Alternately, part or all of the panel 110 can be temporarily removed to install the modular card in a modular card receptacle 132. In at least one embodiment, some or all of the modular cards may include one or more interface receptacles that are accessible at the panel 110 to interface with other components.

In a particular embodiment, the incorporation of one or more modular cards into the television 100 allows for an expansion of the available functionality of the television 100. For example, the television 100 can incorporate the wireless network interface modular card 142 to provide wireless connectivity for the transmission of information to other networked devices. Moreover, the television 100 may incorporate the multimedia decoder modular card 140 to process multimedia data. The processing performed by the multimedia decoder modular card 140 may include, for example, decoding or transcoding encoded multimedia data, encoding unencoded multimedia data, decrypting encrypted multimedia data, and the like.

In an illustrative embodiment, the multimedia data processed by the decoder modular card 140 may be obtained from an external multimedia device, such as a DVD player, via the interfaces 122-128. Alternatively, the multimedia data may be received as a multimedia data stream via the network interface 118 or via the wireless interface modular card 142. The video content of the resulting processed multimedia data may be displayed on the display 102 or the resulting processed multimedia data may be provided to one or more networked devices via the network interface 118 or the wireless network interface modular card 142. Various exemplary techniques for processing multimedia data using the multimedia decoder modular card 140 are discussed in greater detail herein with respect to FIGS. 3-8.

The television 100 can also incorporate the audio receiver modular card 144 to process audio data for output to one or more speakers. In one embodiment, the audio receiver modular card 144 provides many of the features commonly found in separate stereo receivers. The audio data may be received from an external audio device, e.g., a portable music player, via one or more audio inputs 150. Alternately, the audio data may be received via the network interface 118 or the wireless network interface modular card 142. The resulting processed audio data may be provided to one or more wired speakers via speaker outputs 152 or the resulting processed audio data may be provided to one or more wireless speakers via, for example, the wireless network interface modular card 142. Various exemplary techniques for processing audio data using the audio receiver modular card 144 are discussed in greater detail herein with respect to FIGS. 9-12.

The television 100 further may incorporate the video game console modular card 146 to process video game data in response to controller input in order to generate game play for display at the display 102 and output via one or more speakers. The controller input relevant to the game play may be received via one or more controller interfaces 156 connected to corresponding game controllers, commonly referred to as "game pads" or "joysticks", via wired or wireless connections. Video game data processed by the video game console modular card 146 may be obtained from an external device, such as a DVD player that is capable of obtaining video game data from game CDs or DVDs. Additionally, the video game data may be obtained a networked device via the network interface 118 or the wireless network interface modular card 142. Moreover, the network interface 118 or the wireless network interface modular card 142 may be used to transmit game play information to other networked devices for use in, for example, a real-time multiple player video game. Various exemplary techniques for obtaining video game data and for video game processing by the video game console modular card 146 are discussed in greater detail herein with reference to FIGS. 14-18.

Figure 2:
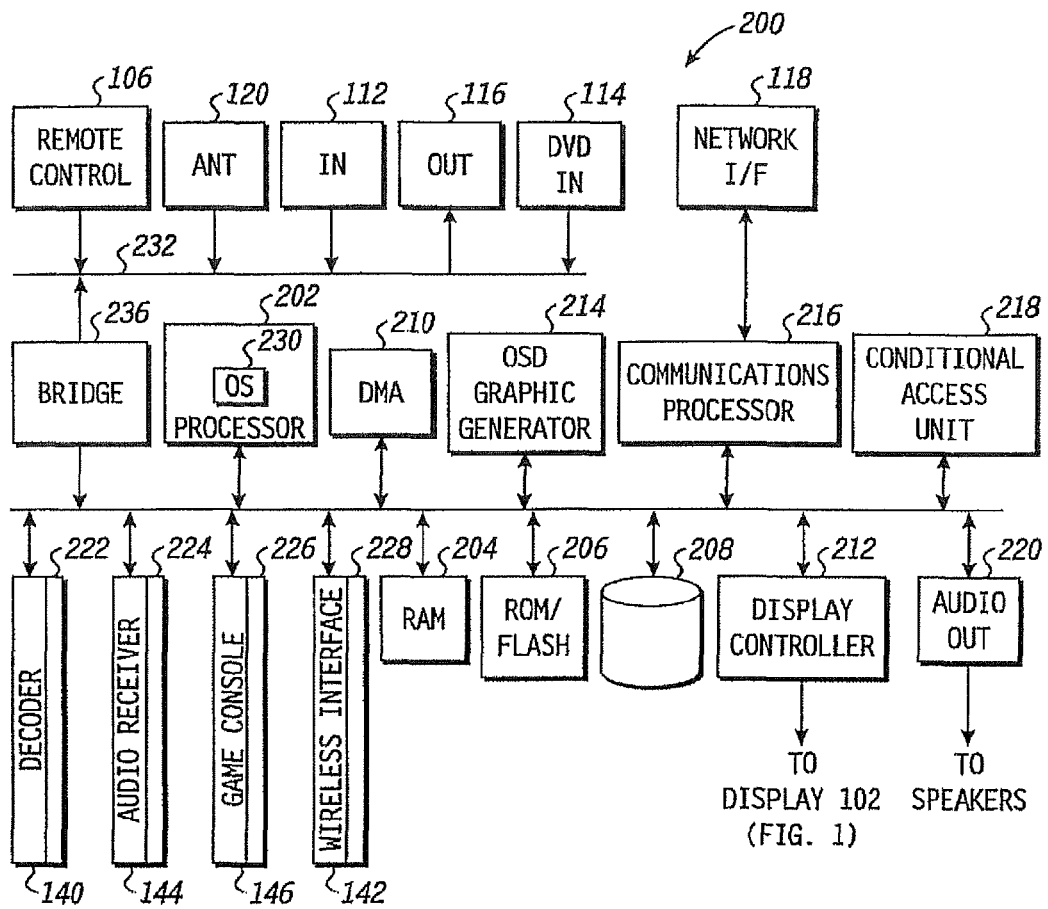
FIG. 2 is a block diagram illustrating an exemplary architecture of the networked television of FIG. 1 in accordance with at least one embodiment of the present disclosure.

Referring to FIG. 2, an exemplary implementation 200 of the television 100 is illustrated in accordance with at least one embodiment of the present disclosure. The television 100 includes one or more processors 202, one or more storage devices, such as a random access memory (RAM) 204, a read only memory or flash memory 206 or a hard disk 208, a direct memory access (DMA) controller 210 and a display controller 212 coupled to the display 102 (FIG. 1). The television 100 also can include an overlay graphics generator 214, a network communications processor 216 connected to the network interface 118, a conditional access unit 218, an audio output 220. The television 100 further can include modular card receptacles 222, 224, 226 and 228 connected to the multimedia decoder modular card 140, the audio receiver modular card 144, the video game console modular card 146 and the wireless network interface modular card 142, respectively. As depicted in FIG. 2, the television 100 can further include the remote control interface 106, the RF antenna interface 120, the IN component 112, the OUT component 114 and the DVD IN component 114 of the panel 110 (FIG. 1). In the illustrated example, some components of the television 100 can be connected via a first bus 232 while other components can be connected via a second bus 234. Further, the busses 232, 234 can be connected by a bus bridge 236.

The processor 202 can perform multimedia processing routines in accordance with an operating system (OS) 230 and facilitates the functions performed by the modular cards that are connected to the modular card receptacles 222-228 of the television 100 by routing information between the components or by handling various aspects of the functions performed by the modular cards. In a particular embodiment, in order to provide prompt, real-time interaction with a television user, e.g., by displaying video content promptly upon request, the OS 230 is a real-time OS having specific functionality that is configured to streamline the operations of the processor 230 and limit the delay between receiving a user request and providing the requested action.

For example, in one embodiment, the OS 230 is stored in the flash memory 206 when the television is powered down, and upon a user request to power up the television, e.g., via the user control buttons 104 or the remote control interface 106, at least a portion of the OS 230 is loaded into a cache of the processor 230 so that the video content of a video data source selected at power up is provided for display within at least ten seconds of receiving the request, or within five seconds or within two seconds of receiving the user request. Additionally, the streamlined OS 230 can allow the television 100 to display video content promptly upon receiving other types of user requests, such as a user request to change television channels or a user request to activate game play associated with video game data processed by the video game console modular card 146. As such, the television 100 can provide the traditional television experience in which changes in the video content displayed and/or the audio content output occur promptly in response to the user's input as one or more requests.

During operation, the various components of the television 100 communicate information via the busses 232 and 234 in order to perform various multimedia-related functions. For example, the communications processor 216 provides communications protocol-specific processing for data received via the network interface 118 and for data to be transmitted on a packet-based network via the network interface 118. Further, the communications processor 216 may implement one or more functions associated with, the Open Systems Interconnection (OSI) seven-layer model or the Telecommunications Protocol/Internet Protocol (TCP/IP) stack. During operation, incoming data that is processed by the communications processor 216 can be routed to one or more of the components of the television 100 as appropriate. The DMA controller 210 can control access to the RAM 204 and/or the ROM 206 by the components of the television 100. Moreover, the overlay graphics generator 214 can generates overlay graphics that overlay the display graphics that are output to the display 102 by the display controller 212.

In a particular embodiment, the modular cards 140-146 may communicate information with each other and with other components of the television, e.g., the processor 202 or the display controller 212, using the modular card receptacles 222-228 and the bus 234. For example, the wireless network interface modular card 142 or the network interface 118 may be used to receive/transmit multimedia data for the decoder modular card 140, receive/transmit audio data for the audio receiver modular card 144, or receive/transmit video game data and related information for the video game console modular card 146. Alternately, multimedia data or video game data may be received via one or more of the RF antenna interface 120, the IN component 112, or the DVD IN component 114. Further, video data that represents video content may be provided from the decoder modular card 140 or the video game console modular card 146 to the display controller 212 so that the video content is displayed by the display 102. Similarly, audio data representing audio content may be provided from the audio receiver modular card 144 to the audio output 220 for output of the audio content by one or more speakers of the television 100.

Figure 3:
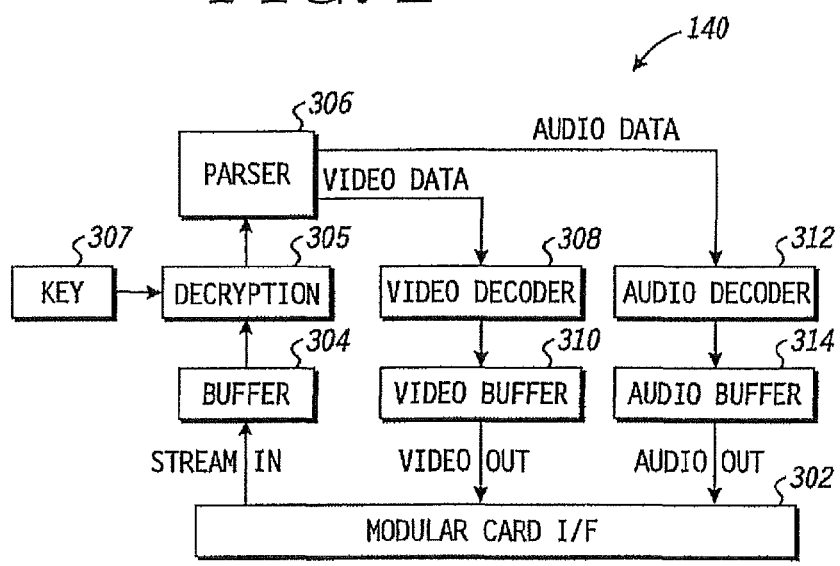
FIG. 3 is a block diagram illustrating an exemplary multimedia decoder modular card architecture in accordance with at least one embodiment of the present disclosure.

Referring to FIG. 3, an exemplary implementation of the multimedia decoder modular card 140 is illustrated in accordance with at least one embodiment of the present disclosure. In the example depicted, the multimedia decoder modular card 140 includes a modular card receptacle interface 302, an input buffer 304, a decryption module 305, a parser 306, a video decoder 308, a video output buffer 310, an audio decoder 312 and an audio output buffer 314. In a particular embodiment, the incoming buffer 304 and the output buffers 310 and 314 may be implemented together as a single buffer.

During operation, incoming multimedia data that is to be processed by the decoder modular card 140 is buffered in the incoming buffer 304. In at least one embodiment, the multimedia data is part of an MPEG data stream. Accordingly, the parser 306 parses the multimedia data to identify the relevant video and/or audio data to be processed. Then, the parser 306 provides the video data to the video decoder 308. The 308 decodes, or transcodes the video data and the resulting decoded/transcoded data can be stored in the outgoing video buffer 310 before being provided to the bus 234 (FIG. 2) for transmission to one or more components of the television 100. Similarly, the audio decoder 312 decodes or transcodes the audio data. Audio data is decoded/transcoded by the audio decoder 312 and the resulting decoded/transcoded audio data is buffered in the outgoing audio buffer 314 before being provided to the bus 234 for transmission to one or more other components of the television 100.

Alternately, in one embodiment, the received multimedia data includes unencoded multimedia data. In this instance, the video decoder 308 also may provide a video encoder to encode the video data to generate encoded video data (e.g., MPEG data) and the audio decoder 312 may include an audio encoder to encode the audio data to generate encoded audio data.

In at least one embodiment, the received multimedia data is encrypted or otherwise protected to prevent unauthorized access to the multimedia content. Accordingly, in at least one embodiment the integrated decoder modular card 140 further comprises a decryption module 305 to process the protected multimedia data to generate unprotected multimedia data using a decryption key 307 supplied by, for example, a provider of the protected multimedia data. In one embodiment, the decryption module 305 processes the protected multimedia data before it is provided to the parser 306. Alternately, the decryption module 305 could be implemented at the output of the parser 306 or as part of the decoders 308 and 312.

Figure 4:
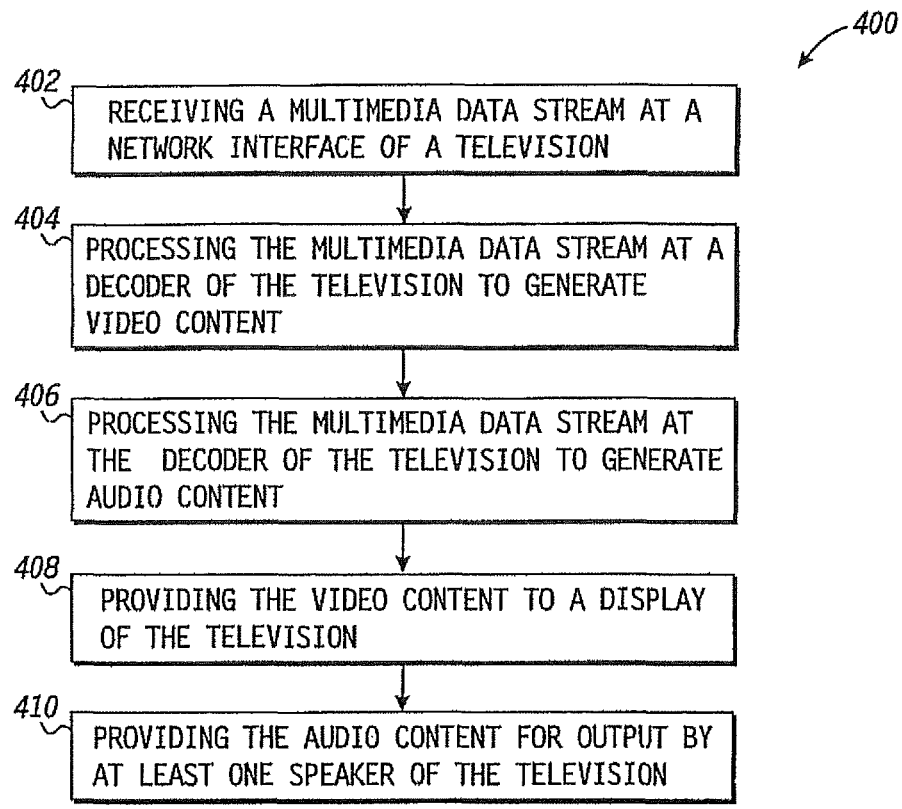
FIG. 4 is a flow diagram illustrating an exemplary method for processing multimedia data at a networked television in accordance with at least one embodiment of the present disclosure.

Referring to FIG. 4, an exemplary method 400 for processing multimedia data at a networked television is illustrated in accordance with at least one embodiment of the present disclosure. The method 400 includes receiving a multimedia data stream at the network interface 118 of the television 100 at block 402. At block 404, video data from the multimedia data stream is processed at a multimedia decoder of the television to generate video content. At block 406, audio data from the multimedia data stream is processed at the multimedia decoder of the television to generate audio content. The multimedia decoder may include a multimedia decoder that is integrated into a core processing component of the television (e.g., an MPEG decoder chip) or the multimedia decoder may include a multimedia decoder modular card 140, as illustrated in FIGS. 1-3. Further, in one embodiment, the audio data and video data are processed by separate components. To illustrate, the audio data can be processed by, for example, the audio receiver modular card 144 whereas the video data can be processed by an integrated multimedia decoder or the multimedia decoder modular card 140. At block 408, the video content is provided to the display 102 of the television 100 for viewing by a user. At block 410, the audio content is provided for output to one or more speakers. The speakers receiving the audio content may be speakers integrated with the television 100 or they may include, for example, speakers wired to the speaker outputs 152 (FIG. 1) or speakers wirelessly connected to the television 100 via the wireless network interface modular card 142 (FIG. 1).

Figure 5:
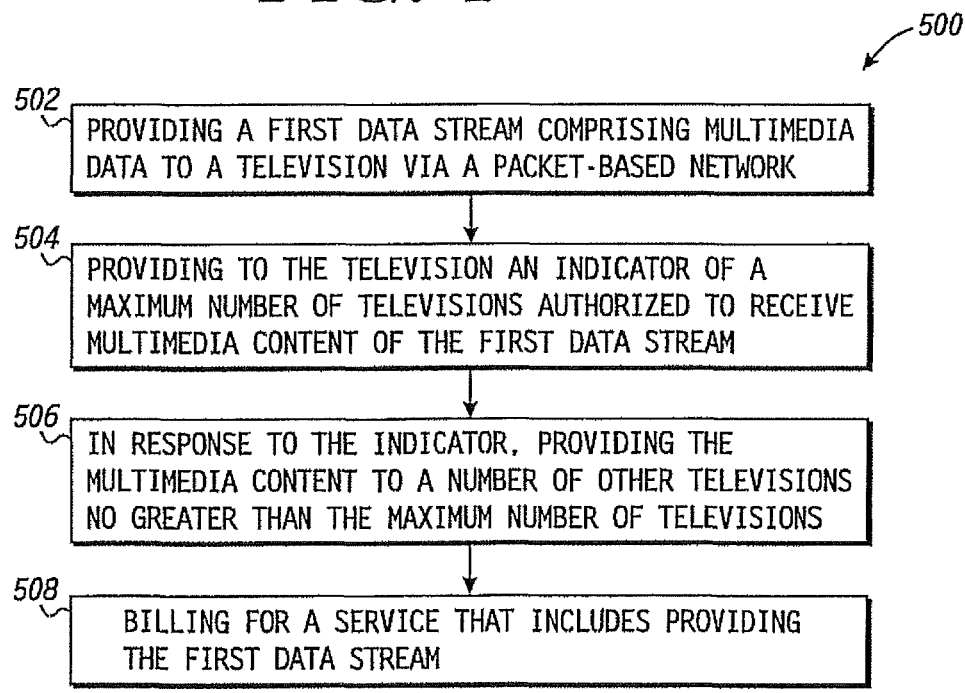
FIG. 5 is a flow diagram illustrating an exemplary method for providing multimedia data to a networked television in accordance with at least one embodiment of the present disclosure.

Referring to FIG. 5, an exemplary method 500 for providing multimedia data to the television 100 is illustrated in accordance with at least one embodiment of the present disclosure. The method 500 includes providing a first data stream including multimedia data from a content provider to the television 100 via a packet-based network, such as, for example, an IP-compliant network at block 502. As noted above, the television 100, in one embodiment, includes a network interface 118 (FIG. 1) to a packet-based network to receive multimedia data and a multimedia decoder to process the multimedia data. As noted above, the content provider may seek to limit distribution of the multimedia content represented by the multimedia data. Accordingly, at block 504, the content provider can provide an indicator of a maximum number of televisions authorized to receive the multimedia content represented by the first data stream. In response to this indicator, the television 100 can provide data representative of the multimedia content to a number of networked devices at block 506, where the number of networked devices receiving the multimedia content is limited based on the indicator. Further, in one embodiment, the content provider may bill the user of the television 100 for services that include providing the first data stream.

Figure 6:
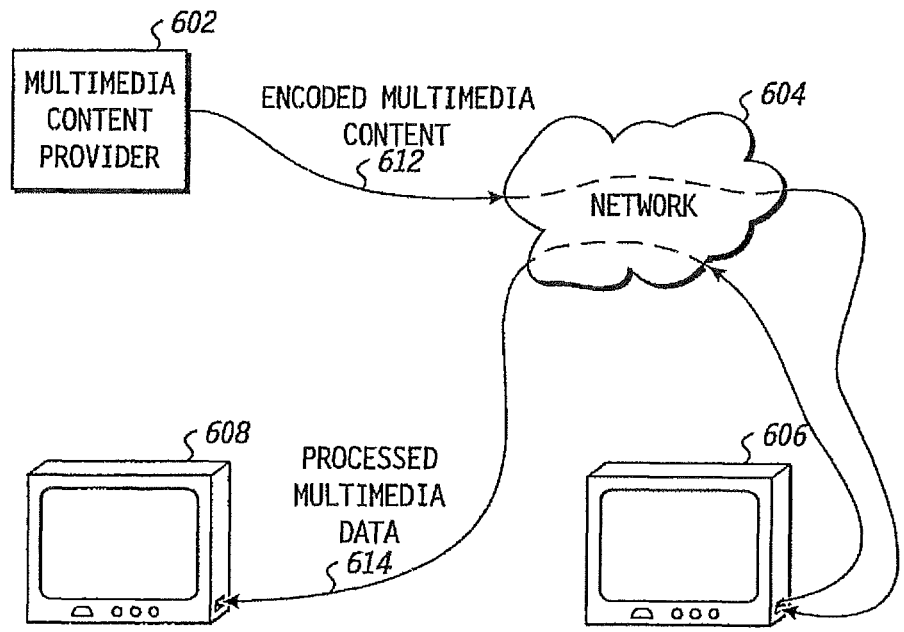
FIG. 6 is a diagram illustrating an exemplary distribution of processed multimedia content via a network in accordance with at least one embodiment of the present disclosure.
Figure 7:
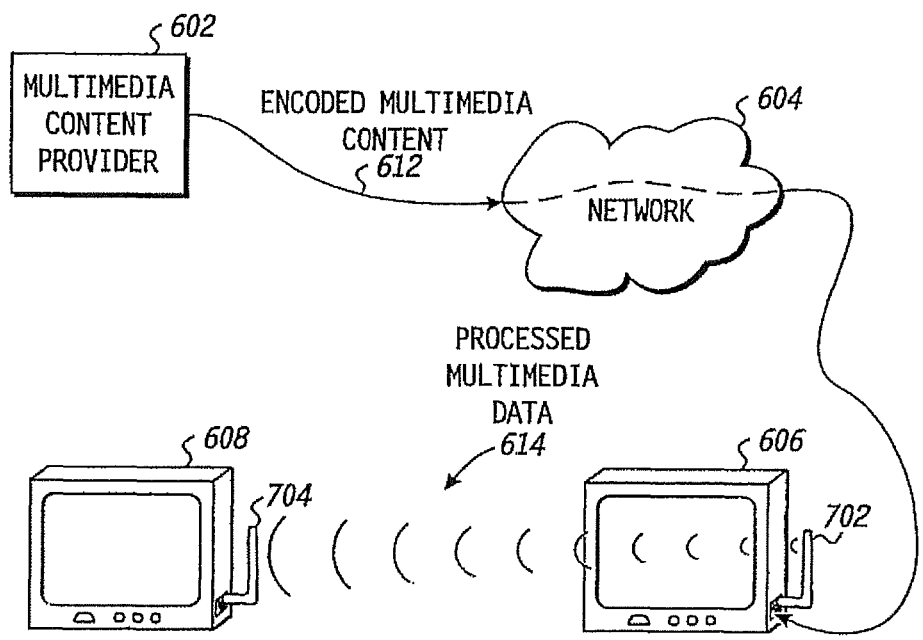
FIG. 7 is a diagram illustrating an exemplary distribution of processed multimedia data content via a wireless medium in accordance with at least one embodiment of the present disclosure.
Figure 8:
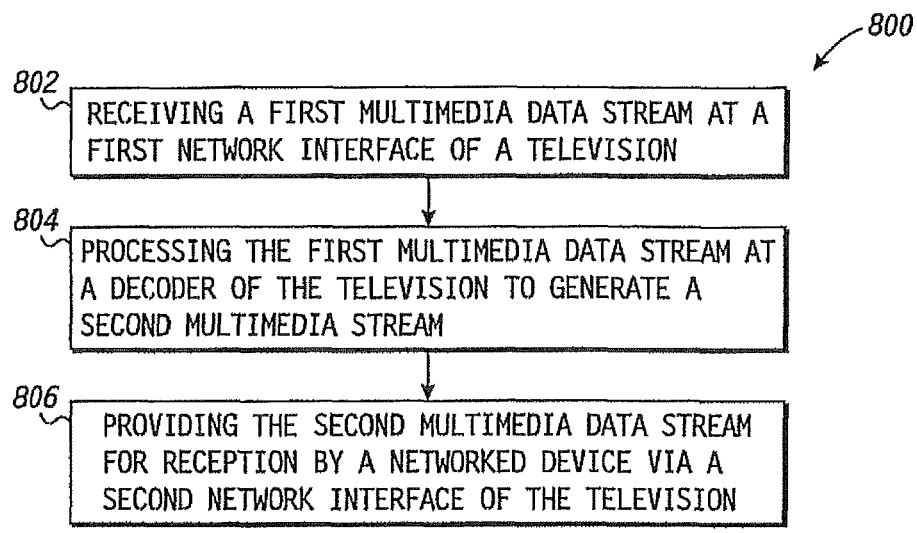
FIG. 8 is a flow diagram illustrating an exemplary method for distributing processed distributing multimedia content in accordance with at least one embodiment of the present disclosure.

Referring to FIGS. 6-8, an exemplary technique for redistributing multimedia data is illustrated in accordance with at least one embodiment of the present disclosure. As depicted by FIG. 6, a multimedia content provider 602 (e.g., an operation maintained by a cable television provider or telecommunications company) may be coupled to television 606 via a packet-based network 604, such as, for example, the Internet or a private network. As part of a broadcast, or in response to a user request, the content provider 602 provides encoded multimedia data 612 to the television 606 via the network 604. The encoded multimedia data 612 is received at the television 606 via a network interface (e.g., network interface 118, FIG. 1) connected to the network 604. The multimedia data 612 can be processed by a multimedia decoder of the television 606 (e.g., multimedia decoder modular card 140, FIG. 1) to generate processed multimedia data 614. Various operations performed on the multimedia data 612 by the television 606 to generate the processed multimedia data 614 may include decoding or transcoding the multimedia data 612, decrypting the multimedia data 612, and the like.

The resulting processed multimedia data 614 can be provided to one or more networked devices for further processing and/or display. In the example illustrated by FIG. 6, the processed multimedia data 614 is transmitted to another television 608 via the network 604. The television 608 may further process the multimedia data 614 for display or for storage. In the example illustrated by FIG. 7, the processed multimedia data 614 may be communicated wirelessly between the television 606 and the television 608 using wireless transceivers 702 and 704, respectively. The wireless transceivers 702 and 704 may be implemented as, for example, the wireless network interface modular card 142 (FIG. 1).

FIG. 8 illustrates an exemplary method 800 for redistributing multimedia content as described with respect to FIGS. 6 and 7. The method 800 includes receiving a first multimedia data stream at a first network interface of a television at block 802, wherein the first network interface is coupled to a packet-based network. The first multimedia data stream may be provided as a scheduled broadcast or may be provided by a content provider in response to a user request for the first multimedia data stream. At block 804, the first multimedia data stream is processed at a multimedia decoder of the television to generate a second multimedia data stream. The multimedia decoder can include, for example, an integrated multimedia decoder or the multimedia decoder modular card 140 (FIG. 1). The processing performed on the first multimedia data stream can include, for example, decoding the first multimedia data stream or transcoding the first multimedia data stream. Moreover, in one embodiment, the first multimedia data stream may include protected multimedia data. Accordingly, the processing performed on the first multimedia data stream further may include decrypting the first multimedia data stream including the protected multimedia data. At block 806, the second multimedia data stream is provided to a networked device via a second network interface of the television. The second multimedia data stream may be provided via the same packet-based network used to receive the first multimedia data stream. In this case, the second network interface and the first network interface may be the same network interface. Alternately, the second multimedia data stream may be provided via another packet-based network (e.g., a wireless network) and therefore may be a different network interface than the first network interface.

The exemplary techniques illustrated in FIGS. 6-8 allow a single television to act as the distribution point for multimedia content received from a content provider. To illustrate, because the television 100, in one embodiment, decodes and/or decrypts the encoded multimedia data 612 to generate unencoded and/or decrypted multimedia data 614, the networked devices receiving the multimedia data 614 (e.g., television 608) do not need to utilize a decoder and/or decryption module to process the multimedia data for display as video and/or audio content. As a result, the decoding/decryption components of the networked devices receiving the multimedia data 614 may be disabled, thereby reducing the power consumption of the networked devices. Moreover, the networked devices may be supplied without decoding/decryption components, thereby reducing their complexity and cost.

Figure 9:
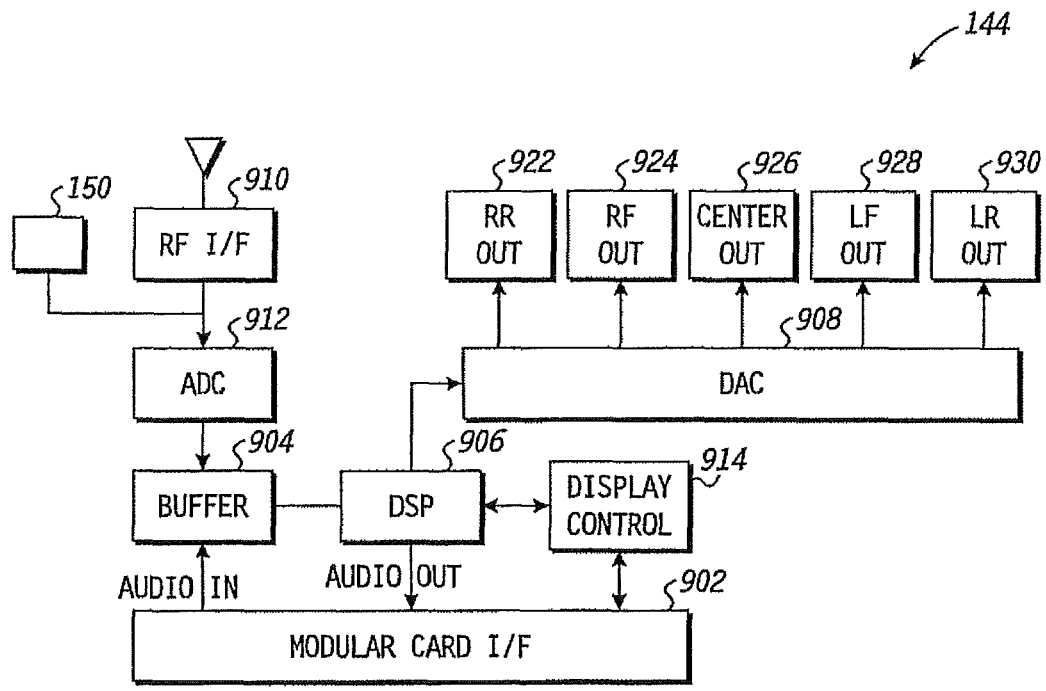
FIG. 9 is a block diagram illustrating an exemplary audio receiver modular card architecture in accordance with at least one embodiment of the present disclosure.

Referring to FIGS. 9 and 10, an exemplary implementation of the audio receiver modular card 144 is illustrated in accordance with at least one embodiment of the present disclosure. As illustrated, the audio receiver modular card 144, in one embodiment, includes a modular card receptacle interface 902, a buffer 904, one or more digital signal processors (DSPs) 906, a digital-to-analog converter (DAC) 908, an RF interface 910, an analog-to-digital converter (ADC) 912, a display control module 914, the audio input 150 and one or more speaker outputs 922-930.

In operation, audio data to be processed can be received from other components of the television via the modular card receptacle interface 902 or from an external audio source via the audio input 150 or via an RF transmission received at the RF interface 910 and converted to digital data by the ADC 912. The received audio data can be buffered in the buffer 904 until accessed by the DSP 906 for processing. Processing operations performed by the DSP 906 can include, for example, decoding (e.g., decoding from an MPEG or MP3 format), decryption, filtering, stereo enhancement, equalization and the like. For example, in one embodiment the DSP 906 performs surround sound processing of the audio data consistent with one or more surround sound standards, such as Dolby Digital 5.1, Dolby Digital Theater System (DTS) Surround, THX Surround EX™, and the like.

The resulting processed audio data may be provided to one or more other components of the television via the modular card receptacle interface 902. For example, the processed audio data may be provided for output to one or more wired speakers via the speaker outputs 922-930 after digital-to-analog conversion by the DAC 908. In the illustrated example, the speaker output 922 connects to a right rear (RR) speaker, the speaker output 924 connects to a right front (RF) speaker, the speaker output 926 connects to a center speaker, the speaker output 928 connects to a left front (LF) speaker and the speaker output 930 connects to a left rear (LR) speaker. Alternately, as illustrated with reference to FIG. 10, the processed audio data (illustrated as audio data 1001) can be provided from the audio receiver modular card 144 to the wireless network interface modular card 142 for transmission to one or more wireless speakers 1002-1008.

In at least one embodiment, the display control module 914 provides display content representing information about the audio receiver modular card 144 for display on the display 102 (FIG. 1). For example, the display control module 914 may provide graphical data representing equalization settings, where the graphical content of the graphical data is laid over video content from another source on the display 102. Other information for display can include, for example, volume settings, speaker setup, artist and track information, and the like. Moreover, in one embodiment, the operation of the audio receiver card module 144 is responsive to user commands (e.g., remote control commands). For example, after displaying the current equalization settings on the display 102, remote control commands from a user representing a desired change in equalization settings can be received by the display control module 914. In response, the display control module 914 can send a signal to the DSP 906 to change the equalization settings as well as provide updated equalization settings graphical display information for display by the display 102 so that the user can visual confirm that the requested changes are made. Other operations affected by user input can include, for example, volume settings, channel selection, track selection, speaker setup, surround sound settings, and the like.

Referring to FIG. 11, an exemplary method 1100 for providing audio data for processing at a networked television is illustrated in accordance with at least one embodiment of the present disclosure. The method 1100 includes providing an audio data stream to the television via a packet-based network at block 1102. In one embodiment, the television comprises an exterior interface panel including a plurality of interface connections, a network interface to the packet based network to receive the multimedia data, and an audio receiver modular card (e.g., audio receiver modular card 144, FIG. 1) to process the audio data stream. In certain instances, a content provider may attempt to protect the audio data stream by encrypting the audio data. In such instances, the audio receiver modular card may have access to a decryption key provided by the content provider, at block 1104, or otherwise made available to the audio receiver modular card. The audio receiver modular card thus may use this decryption key to decrypt or otherwise decode the protected audio data. At block 1106, a user of the television is billed for services including providing the audio data stream to the television. For example, the user may have subscribed to a service and may receive a monthly bill.

Referring to FIG. 12, an exemplary method 1200 for processing audio data using the audio receiver modular card 142 is illustrated in accordance with at least one embodiment of the present disclosure. The method 1200 includes receiving first audio data at an audio receiver modular card of a television via a first network interface of the television (e.g., network interface 118 of television 100, FIG. 1) at block 1202. At block 1204, the first audio data is processed at the audio receiver modular card to generate second audio data. Processing operations performed by the audio receiver modular card may include, for example, decoding, filtering, formatting, and the like. At block 1206, the second audio data is provided for output to one or more speakers. In one embodiment, the second audio data is provided to one or more speakers via one or more speaker outputs of the audio receiver modular card. In an alternate embodiment, the second audio data is wirelessly transmitted to one or more wireless speakers via a wireless network interface of the television (e.g., wireless network interface modular card 142, FIG. 1).

Figure 13:
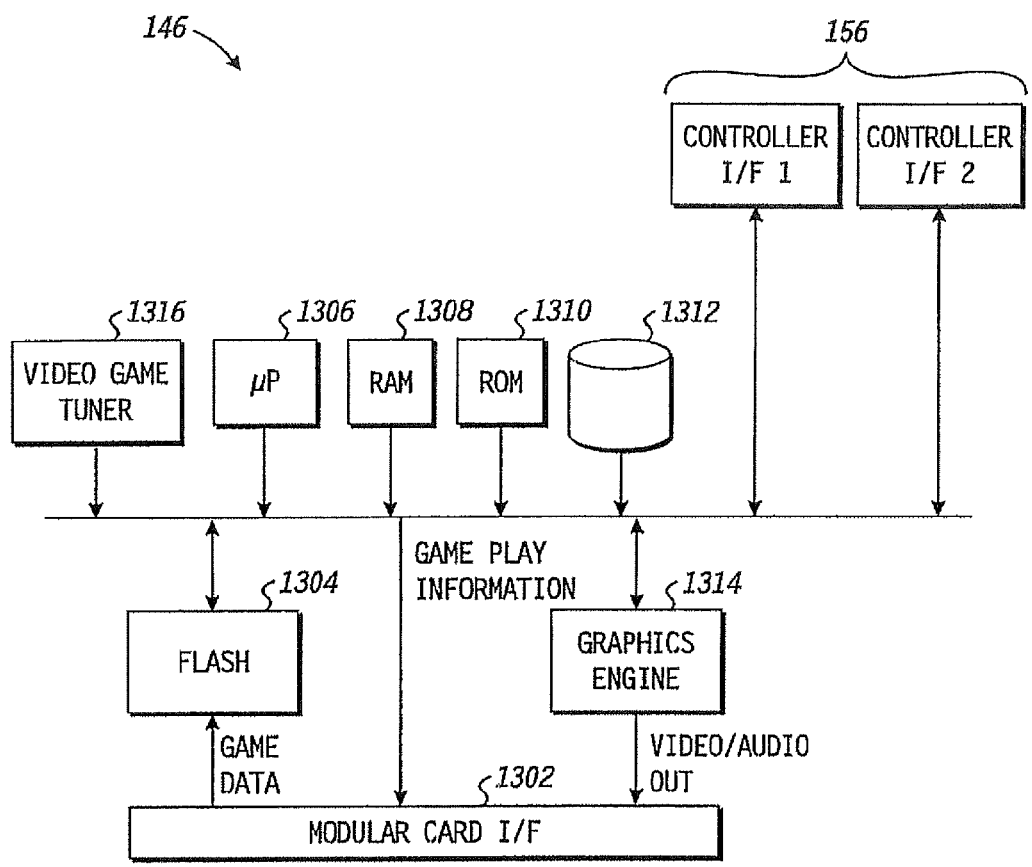
FIG. 13 is a block diagram illustrating an exemplary video game console modular card architecture in accordance with at least one embodiment of the present disclosure.

Referring to FIG. 13, an exemplary implementation of the video game console modular card 146 is illustrated in accordance with one embodiment of the present disclosure. In the depicted example, the game console modular card 146 includes a modular card receptacle interface 1302 for connecting to a modular card receptacle of the networked television 100 (FIG. 2), flash memory 1304, one or more processors 1306, RAM 1308, ROM 1310, a hard disk 1312, a graphics engine 1314, a video game tuner 1316, and one or more game controller interfaces 156.

In operation, video game data is provided to the television 100 via a network or by an external video game data source, such as a DVD player. The video game data is forwarded to the game console modular card 146 via the modular card receptacle interface 1302. The video game data may be stored in flash memory 1304, RAM 1308 and/or the hard disk 1312. The video game tuner 1316 manages the storage of video game data supplied to the television via one or more transmission channels.

The processor 1306 executes instructions represented by the video game data in response to user game controller signals received via the game controller interfaces 156. As noted above, the game controller interfaces 156 may include interfaces to wired game controllers or may include wireless interfaces to wireless game controllers. Data representing the video content of the game play is provided to the graphics engine 1314 whereupon the data is rendered into display data for output to the display 102 (FIG. 1) of the television. Data representing the audio content is processed by the processor 1306 or by an audio decoder (not shown) of the modular card 146. Alternately, the audio data is provided to the audio receiver card 144 or to the multimedia decoder card 140 for processing. The resulting audio content is output to one or more speakers associated with the television (e.g., integrated speakers or speakers connected via the audio receiver modular card 144, FIG. 1). The data representative of the video/audio content can be provided to a core component of the television 100 (e.g., the processor 202 or a dedicated television graphics engine) via the modular card receptacle interface 1302 for rendering into display data and output audio content.

In some instances, the game play represented by the video game data may be multiplayer game play that occurs among multiple players in separate locations. Accordingly, in at least one embodiment, the processor 1306 provides game play information for transmission by other game consoles involved in the same game play. To illustrate, the game play information is provided to the other components of the television 100 via the modular card receptacle interface 1302, whereby the game play information may be communicated to other networked game consoles via the network interface 118 (FIG. 1) or wirelessly communicated to other wireless game consoles via the wireless network interface modular card 142 (FIG. 1).

Figure 14:
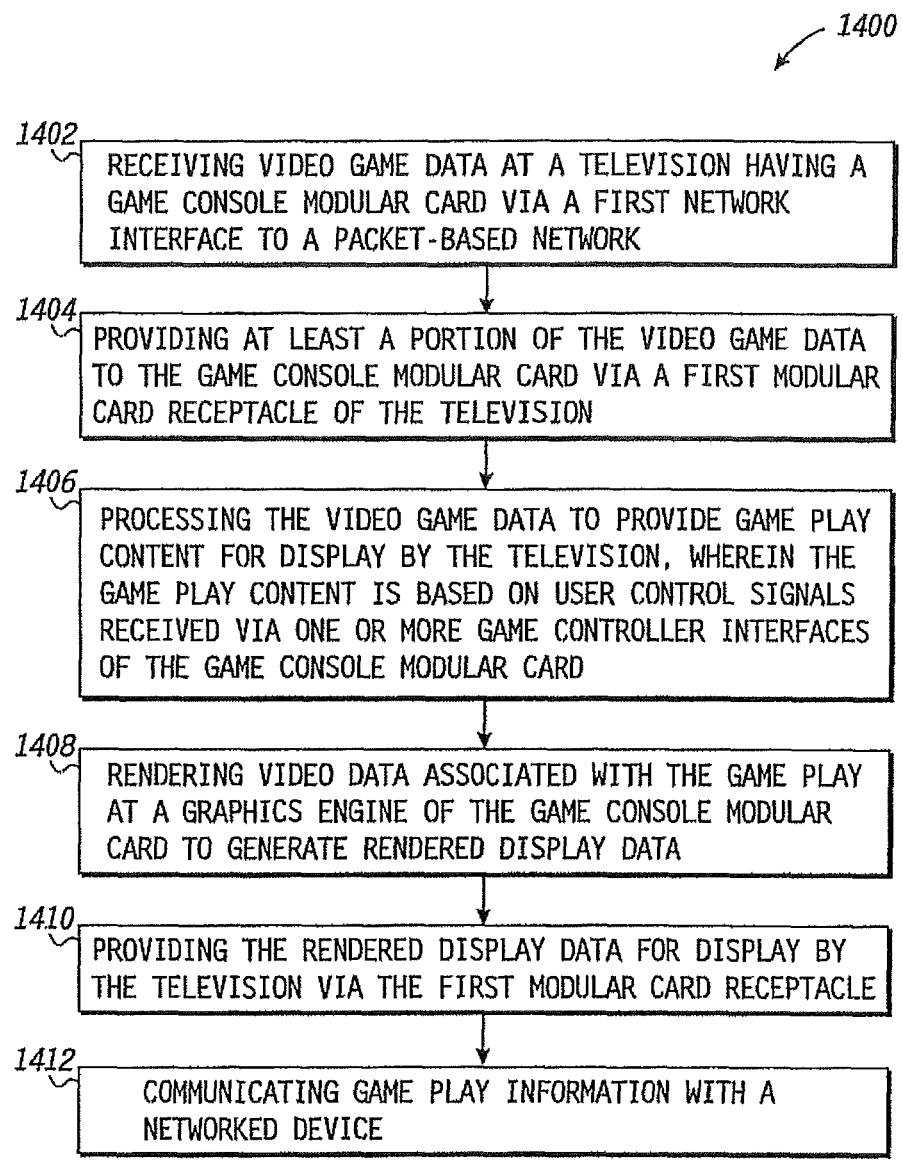
FIG. 14 is a flow diagram illustrating an exemplary method for processing video game data at a networked television in accordance with at least one embodiment of the present disclosure.

Referring to FIG. 14, an exemplary method 1400 for processing video game data at a video game console modular card of a television is illustrated in accordance with at least one embodiment of the present disclosure. The method 1400 includes receiving video game data at the television via a network interface to a packet-based network at block 1402. In one embodiment, the video game data is received as part of a multimedia data stream transmitted by a multimedia content provider via the packet-based network. For example, the video game data could be represented by one or more transmission channels of the multimedia data stream. At block 1404, at least a portion of the video game data is provided to the game console modular card (e.g., the game console modular card 146) via a first modular card receptacle of the television. At block 1406, the video game data is processed to provide game play content for display by the television, wherein the game play content is based on user control signals received via one or more game controller interfaces of the game console modular card. At block 1408, video game data associated with the game play is rendered at a graphics engine of the game console modular card to generate rendered display data, and, at block 1410, the rendered display data is provided for display via the first modular card receptacle. At block 1412, game play information is communicated with one or more networked devices (e.g., other networked televisions having game console modular cards) via the first network interface or via a second network interface, such as a wireless network interface modular card.

Figure 15:
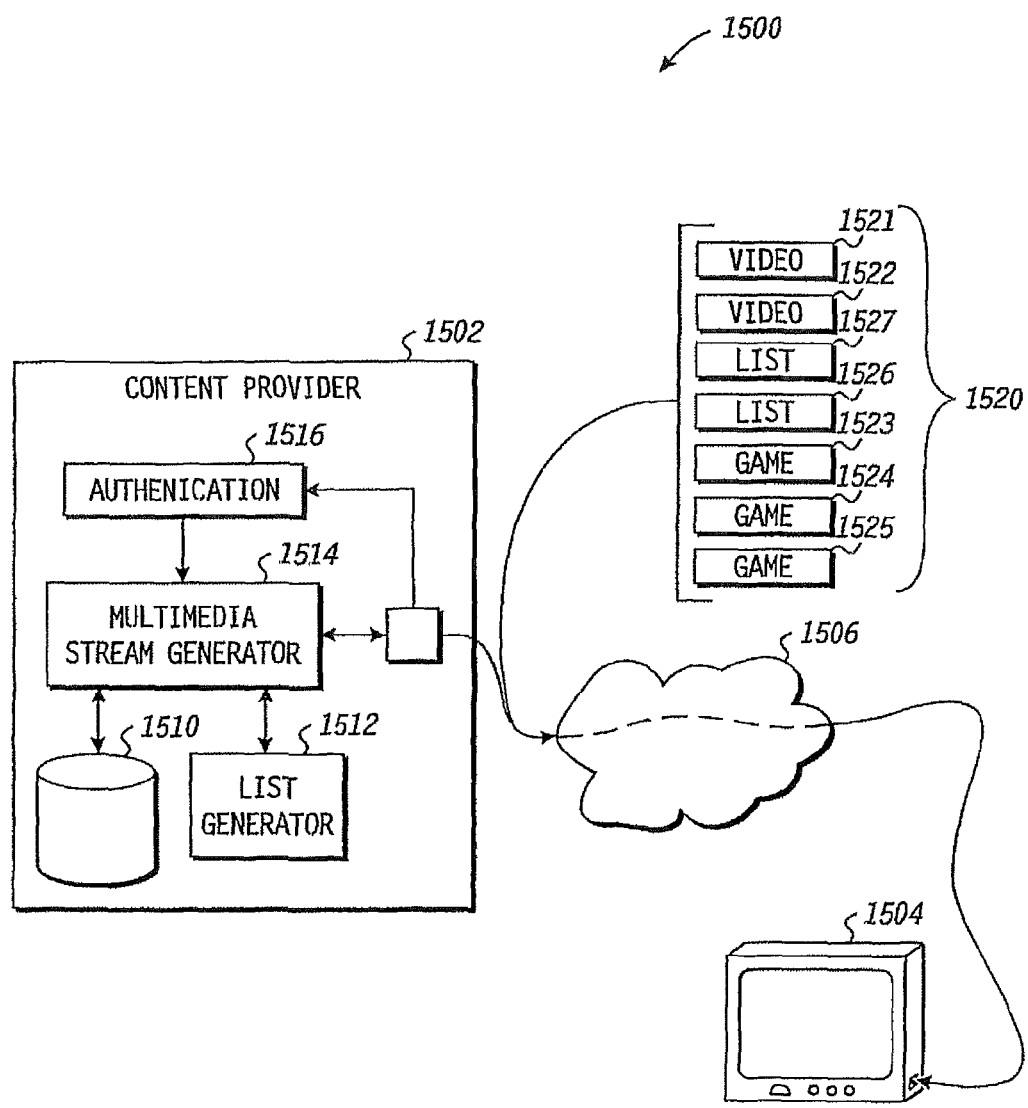
FIG. 15 is a diagram illustrating an exemplary provision of video game data via one or more television channels in accordance with at least one embodiment of the present disclosure.

Referring to FIGS. 15-18, exemplary techniques for providing video game data via one or more transmission channels are illustrated in accordance with at least one embodiment of the present disclosure. FIG. 15 illustrates an exemplary video game distribution system 1500 including a video game provider 1502 and a networked device 1504 connected via a network 1506. The networked device 1504 may include any of a variety of devices capable of receiving and processing multimedia transmissions comprising a plurality of transmission channels (such as, for example, a digital cable transmission or a satellite television transmission). For ease of illustration, the networked device 1504 is discussed in the context of a networked television as described in detail above.

In the illustrated embodiment, the video game provider 1502 includes video game data storage 1510 for storing video game data associated with one or more video games, a list generator 1512, a multimedia stream generator 1514, and an authentication module 1516.

In operation, the multimedia stream generator 1514 generates one or more multimedia data streams 1520 for transmission to the networked device 1504. In addition to transmission channels having conventional video and/or audio data representative of television programs or radio programs, such as video channels 1521 and 1522, one or more transmission channels of the multimedia data stream 1520 can include video game data, such as game channels 1523-1525. Accordingly, to download the video game data associated with a particular video game, the networked device 1504 may select the game channel of the multimedia data stream 1520 associated with a desired video game and may store video game data transmitted via the selected channel.

To illustrate, a user of the networked device 1504 may provide a remote control command or other user input that causes the networked device to "tune" to a transmission channel selected by the user. Once "tuned" to this channel, the networked device 1504 may provide a request for the associated video game data from the video game provider 1502. The authentication module 1516 authenticates an identifier associated with the user request to determine whether the user is authorized to access the video game data. If so authorized, the multimedia stream generator 1514 obtains the requested video game data from the video game data storage 1510 and inserts the requested video game data into the appropriate game channel of the multimedia data stream 1520. The authentication module 1516 further may store the request for video game data for billing purposes associated with providing the requested video game data.

Alternately, the video game data associated with one or more video games may be inserted by the multimedia stream generator 1514 in a repeating manner. In this instance, once the networked device 1504 is "tuned" to the selected game channel, the networked device 1504 may delay storing the video game data in the selected game channel until the starting byte of the video game data is retransmitted in the next iteration. Rather than waiting for the starting byte of the video game data, the networked device 1504 instead can identify an entry point where the networked device 1504 began storing video game data transmitted in the selected game channel and can cease storing video game data when the identified entry point is encountered again during the next transmit iteration of the video game data. For example, if the networked device 1504 tunes to the selected channel and starts recording the video game data at byte 1000, the networked device 1504 would continue to record the video game data through the end byte of the present iteration until byte 999 of the next iteration is encountered. Thus, the networked device 1504 can store the entire video game data without delaying until the start of the next iteration of the transmission of the video game data in the selected transmission channel.

The association of video games and their corresponding transmission channels may be provided to a user in any of a variety of ways. For example, a printed publication could be provided that indicates which transmission channels are used to carry the video game data of certain video games. However, the use of a printed publication typically results in a static assignment of channels and may cause inconvenience on the part of the user if the printed publication is misplaced or otherwise unavailable. Accordingly, in at least one embodiment, the list generator 1512 generates one or more lists for display as video content, where the lists, when displayed, provide an indication of available video games and identifiers (e.g., channel numbers) of their corresponding transmission channels. An exemplary display of a list is discussed below with reference to FIG. 16. The lists of available video games may be organized by any of a variety of characteristics, such as rankings, genres, costs, system requirements, and the like. To illustrate, the list generator 1512 can generate, for example, a list of the top five video game rentals, a list of the top ten best selling video games, a list of newly introduced video games, a list of action/adventure video games, a list of role-playing video games, a list of video games suitable for children, and other lists.

Multimedia data representative of the one or more generated lists can be provided to the networked device 1504 as one or more list channels, such as list channels 1526 and 1527, of the multimedia data stream 1520. Accordingly, when the networked device 1504 is "tuned" to a list channel, the network device 1504 may provide the video content representative of the list associated with the selected list channel for display at the networked device. The user, upon viewing the video content representative of the list, may ascertain the transmission channel carrying data for the video game in which the user is interested. The user then can direct the networked device 1504 to "tune" to the identified transmission channel (using, for example, remote control commands) so that the video game data can be obtained from the identified transmission channel and stored (e.g., at the hard disk 1312 of the video game console modular card 146, FIG. 13) for subsequent use.

Figure 16:
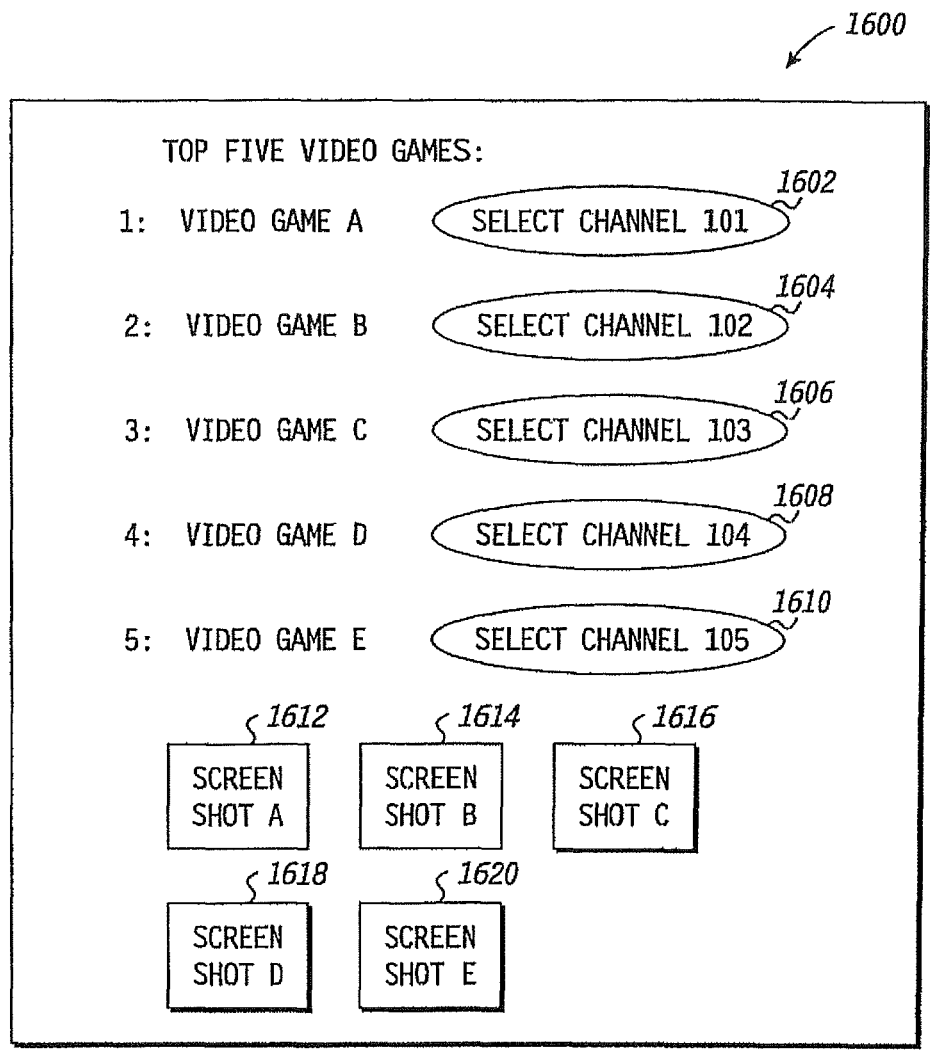
FIG. 16 is a diagram illustrating an exemplary video game download selection display screen in accordance with at least one embodiment of the present disclosure.

Referring to FIG. 16, an exemplary display of a list of video games at a networked device (e.g., the television 100, FIG. 1) is illustrated in accordance with at least one embodiment of the present disclosure. In the depicted example, the displayed list 1600 provides a listing of five available video games (video games A, B, C, D and E) identified as being the top five in rental frequency. Each video game listed also includes a visual indicator of the transmission channel that carries the video game data representing the video game. For example, the visual indicator may include "select channel" icons 1602-1610 corresponding to video games A-E, respectively, where the icons 1602-1610 provide a visual representation of the corresponding transmission channels (e.g., channels 101-105). The displayed list 1600 further may include screen shots 1612-1620 for one or more of the listed video games, as well as written descriptions, critic reviews or ratings of the listed video games (not shown).

Figure 17:
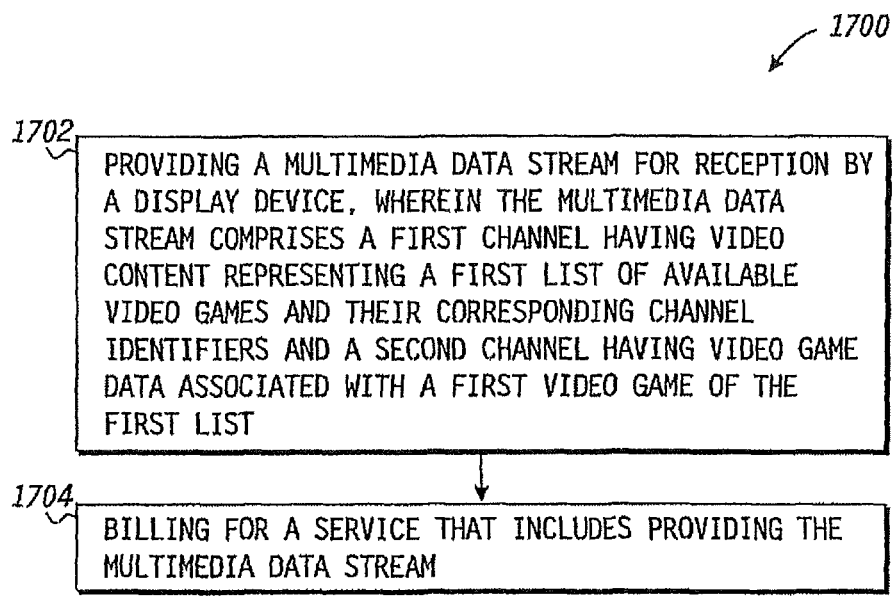
FIG. 17 is a flow diagram illustrating an exemplary method for providing video game data via one or more transmission channels in accordance with at least one embodiment of the present disclosure.

Referring to FIG. 17, an exemplary method 1700 for providing video game data as one or more transmission channels of a multimedia data stream is illustrated in accordance with at least one embodiment of the present disclosure. At block 1702, a multimedia data stream is provided for reception by a display device, where the multimedia data stream includes a first channel having video content representing a first list of available video games and their corresponding channel identifiers and a second channel having video game data associated with a first video game of the first list and where the second channel is associated with a first channel identifier corresponding to the first video game. The multimedia data stream also can include other channels associated with other video games. The multimedia data stream can be provided as, for example, a digital cable television transmission or a satellite television transmission, a multimedia data stream transmitted over a packet-switched network. In at least one embodiment, the display device is a networked device, such as a networked television as discussed above.

To discourage unauthorized access, the video game data can be encrypted, such as at the video game content provider, prior to providing the multimedia data stream or prior to inserting the video game data into the multimedia data stream. Accordingly, a decryption key that is used to decrypt the encrypted video game data may be provided by the video game content provider or otherwise made available to the networked device. In one embodiment, the identification of the networked device is verified prior to providing or making the decryption key available. This verification process may include verifying that the particular display device and/or a particular user are authorized to use the video game data.

In one embodiment, the video game data associated with the first video game is provided in a continuous loop as the second transmission channel. Alternately, the video game data associated with the first video game is provided by a video game content provider in response to a user request for the video game data from the networked device. The user request may be initiated by a user remote control command directing the networked device to tune to the transmission channel identified by the first channel identifier.

As noted above, the multimedia data stream may represent the transmission of multimedia content in accordance with a service agreement or arrangement between a user and a content provider. Accordingly, at block 1704 the user's access of the video game data from the second channel is noted at the content provider and a charge is included in a billing statement sent to the user for the service that includes providing the multimedia data stream.

Figure 18:
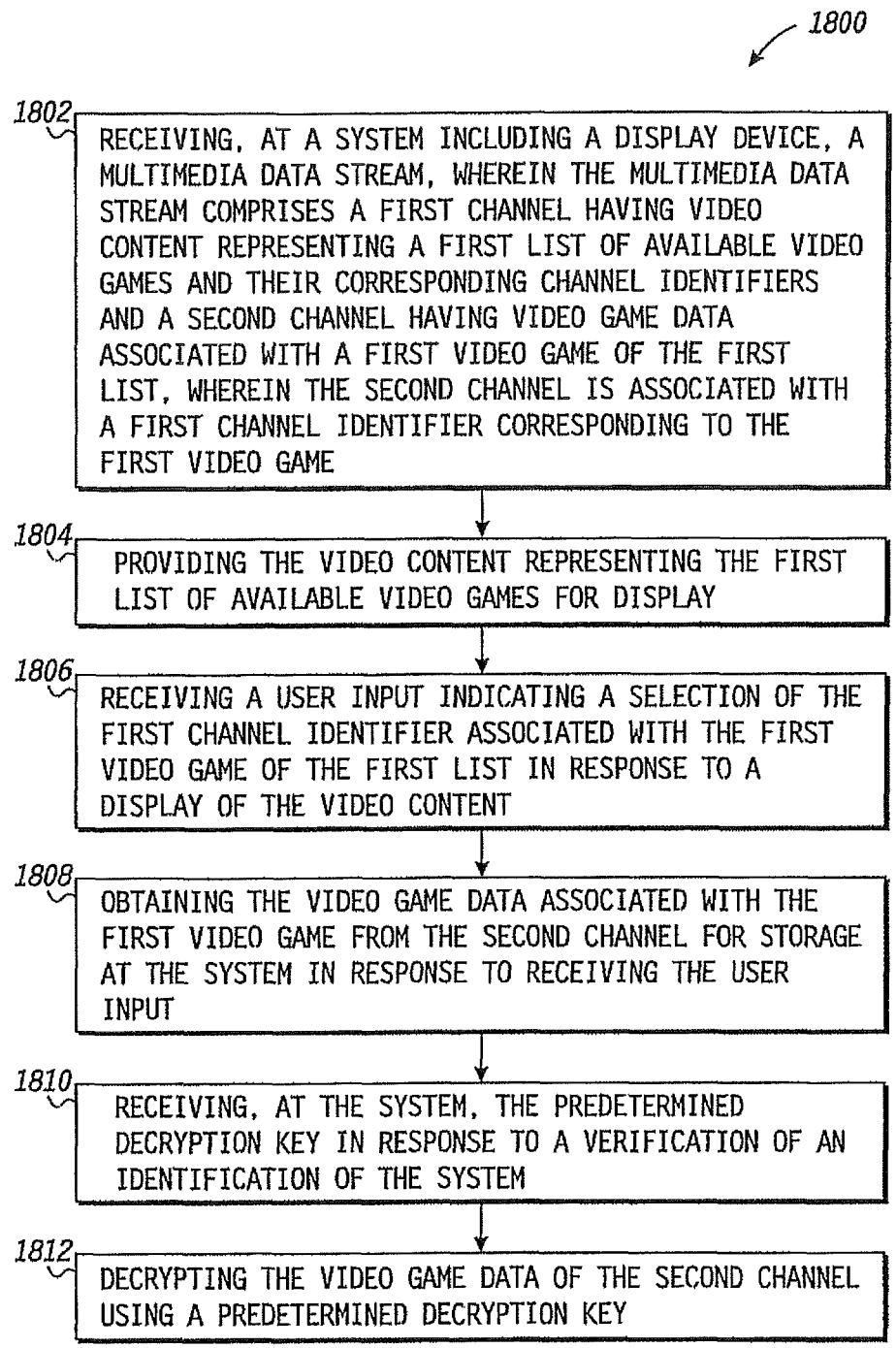
FIG. 18 is a flow diagram illustrating an exemplary method for obtaining video game data at a networked television in accordance with at least one embodiment of the present disclosure.

Referring to FIG. 18, an exemplary method 1800 for obtaining video game data from one or more channels of a multimedia data stream is illustrated in accordance with at least one embodiment of the present disclosure. The method 1800 includes receiving a multimedia data stream at a system including a display device at block 1802. The multimedia data stream includes a first channel having video content representing a first list of available video games and their corresponding channel identifiers and a second channel having video game data associated with a first video game of the first list. The second channel is associated with a first channel identifier corresponding to the first video game. In one embodiment, the system includes a networked television (e.g., television 100, FIG. 1) having a game console modular card (e.g., game console modular card 146, FIG. 1) to process the received data. In one embodiment, the storage of video game data at a hard disk 1312 (FIG. 13) of the game console modular card 146 is handled by the video game tuner 1316.

At block 1804, the video content representing the first list of games is provided for display at the display device. In the event that the system includes a networked television as described above, the networked television may include a decoder, such as an integrated decoder or a decoder modular card 140 (FIG. 1) to generate display data representative of the video content of the first channel for viewing by the user. At block 1806, user input indicating a selection of the first channel identifier associated with the first video game of the first list is received in response to display of the video content. The user input may include, for example, a request to "tune" the system to the transmission channel associated with the first channel identifier, where the request may be a remote control command or input received via, for example, a channel change button.

At block 1808, the video game data associated with the first video game from the second channel is obtained for storage at the system in response to receiving the user input. As noted above, the video game data may be provided in a single transmission at a predetermined time or in a continuous loop or the video game data can be added to the multimedia data stream in response to a request by the user. In the event that the data is provided in a continuous loop, obtaining the video game data can include identifying a start position within a present loop of the video game data and continuing to store the video game data until a corresponding position to the start position is encountered for the next loop of the video game data. In the event that the video game data is encrypted, at block 1810, a decryption key can be received at the system in response to a verification of an identification of the system. At block 1812, the video game data can be decrypted using the decryption key. In the event that the system includes the networked television 100, the obtained video game data can be stored at the hard disk 1312 (FIG. 13) of the video game console modular card 146 of the television 100 for subsequent processing to provide game play to a user.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A television comprising:
a display;
a first network interface to a packet-based network, wherein the first network interface is configured to receive a multimedia data stream from the packet-based network, wherein the multimedia data stream comprises content representing a first list of available video games and video game data associated with a first video game of the first list;
a decoder operable to generate display data representative of the content at a first region of the display, the display data displayable on the display within ten seconds of receipt of a user request for the multimedia data stream, wherein the display data comprises a listing of titles of the available video games from the first list in a first column and an indicator associated with each game in the listing of the available video games in a second column adjacent to the first column; and
a game console modular card operable to receive the video game data from the decoder in response to user selection of the first video game via a remote control and operable to process the video game data to display game play content, wherein the game play content is based on user control signals received via a game controller coupled to a controller interface of the game console modular card.

2. The television of claim 1, further comprising a modular card interface coupled to the first network interface of the television, wherein the decoder includes a decoder modular card coupled to the modular card interface, and wherein the television is operable to display the display data on the display upon receipt of a user request to power up the television.

3. The television of claim 2, further comprising a wireless network interface card coupled to the modular card interface.

4. The television of claim 1, further comprising a second network interface, wherein the second network interface is a wireless network interface supported by a wireless network interface modular card coupled to the decoder via a modular card interface.

5. The television of claim 1, wherein the multimedia data stream includes protected multimedia data and wherein the decoder processes the protected multimedia data to generate unprotected multimedia data and provides the unprotected multimedia data to a networked device via the first network interface.

6. The television of claim 5, wherein the unprotected multimedia data is provided to a second networked device via a second network interface of the television.

7. The television of claim 6, wherein the second network interface comprises a wireless network interface that includes a wireless network interface modular card coupled to the decoder via a modular card interface.

8. The television of claim 1, wherein the game console modular card includes a second controller interface configured to receive a second game controller, and wherein the game play content is further based on second user control signals received via the second game controller.

9. The television of claim 1, wherein the display data representative of the content is displayed within five seconds of receiving the user request.

10. The television of claim 1, wherein the display data further comprises a screen shot for an available game of the available video games from the listing at a second region of the display separate from the first region.

11. The television of claim 1, wherein:
the first network interface is disposed at an exterior surface of a housing of the television, at least a portion of the first network interface exterior to the housing; and
the decoder is disposed interior to the housing.

12. The television of claim 1, further comprising a remote control interface to receive a remote control command communicated wirelessly, wherein an operation of the television is responsive to the remote control command.

13. A television comprising:
a television housing;
a display within the television housing;
a first network interface to a packet-based network, wherein the first network interface is within the television housing and wherein the first network interface is configured to receive multimedia data from the packet-based network, wherein the multimedia data comprises content representing a first list of available video games and corresponding identifiers;
a processor to process data transmitted via the first network interface, wherein the processor is within the television housing;
modular card interfaces coupled to the processor, wherein the modular card interfaces are within the television housing;
a game console modular card coupled to a first modular card interface of the modular card interfaces, the game console modular card operable to process second content to display game play content in response to selection of a video game via a remote control, wherein the game play content is based on user control signals received via a game controller coupled to a controller interface of the game console modular card; and
a multimedia decoder card coupled to a second modular card interface of the modular card interfaces, the multimedia decoder card to generate display data representative of the content, wherein the multimedia decoder is within the television housing;
wherein the television is operable to display the display data upon receipt of a request to power up the television.

14. The television of claim 13, further comprising a second network interface that comprises a wireless network interface card coupled to a third modular card interface of the modular card interfaces.

15. The television of claim 13, wherein the multimedia data comprises protected multimedia data and wherein the multimedia decoder card processes the protected multimedia data to generate unprotected multimedia data.

16. The television of claim 13, further comprising a remote control interface to receive a remote control command, wherein an operation of the television is responsive to the remote control command.

17. A method comprising:
receiving a multimedia data stream at a network interface of a television, wherein the network interface is coupled to a packet-based network, wherein the multimedia data stream comprises content representing a first list of available video games and corresponding identifiers and video game data associated with a first video game of the first list;
generating, at a decoder, display data representative of the content;
providing the display data to a display of the television;
generating, at the decoder, audio content from the multimedia stream;
providing the audio content for output by a speaker of the television;
receiving a selection of the first video game via a remote control; and
sending the video game data to a game console modular card in response to the selection of the first video game, wherein the game console modular card processes the video game data to display game play content, wherein the game play content is based on user control signals received via a game controller coupled to a controller interface of the game console modular card;
wherein the television displays the display data upon receipt of a request to power up the television.

18. The method of claim 17, further comprising receiving user input, wherein the multimedia stream is received in response to the request, and wherein the television displays the display data within ten seconds of receipt of the user input.

19. A method comprising:
receiving a first multimedia data stream at a first network interface of a television, wherein the first multimedia stream comprises a content representing a first list of available video games and corresponding identifiers and video game data associated with a first video game of the first list;
generating, at a decoder, display data representative of the content;
sending the display data to a display of the television in response to receipt of a request to power up the television, wherein the display data comprises a listing of the available video games from the first list and an indicator associated with each game in the listing of the available video games;
receiving, at the television, input corresponding to the first video game and identification of a number of separately located networked devices to receive the first video game;
receiving an indicator of a threshold number of devices authorized to receive the first video game; and
sending a second multimedia data stream of the first video game for reception by each of the separately located networked devices to receive the first video game via a second network interface of the television in response to determining that the number does not exceed the threshold number.

20. The method of claim 19, wherein generating the display data at the decoder comprises decrypting the first multimedia data stream.

\* \* \* \* \*